US006809281B2

(12) United States Patent
Miki

(10) Patent No.: US 6,809,281 B2
(45) Date of Patent: Oct. 26, 2004

(54) PUSHBUTTON SWITCH

(75) Inventor: Toru Miki, Tokyo (JP)

(73) Assignee: Miyama Electric Co., Ltd., Tokyo (JP)

(*) Notice: Subject to any disclaimer, the term of this patent is extended or adjusted under 35 U.S.C. 154(b) by 28 days.

(21) Appl. No.: 10/252,839

(22) Filed: Sep. 24, 2002

(65) Prior Publication Data

US 2003/0173203 A1 Sep. 18, 2003

(30) Foreign Application Priority Data

Mar. 14, 2002 (JP) ....................................... 2002-069391

(51) Int. Cl.[7] .......................... H01M 3/02; H01M 19/54

(52) U.S. Cl. ....................................................... 200/529

(58) Field of Search .................................. 200/520–535

(56) References Cited

U.S. PATENT DOCUMENTS 4,293,751 A * 10/1981 Van Benthuysen et al. . 200/527
4,891,476 A * 1/1990 Nation et al. ........... 200/527 X
4,939,328 A 7/1990 Smith
4,997,999 A 3/1991 Valenzona
5,049,709 A 9/1991 Prickett et al.
5,132,499 A 7/1992 Valenzona et al.
5,186,316 A * 2/1993 Mortun et al. .............. 200/527
5,226,529 A * 7/1993 Valenzona .................. 200/529
5,847,345 A 12/1998 Harrison
5,994,654 A 11/1999 Benson
6,191,376 B1 * 2/2001 Bartok ....................... 200/529
6,396,015 B1 * 5/2002 Ko ............................. 200/529

FOREIGN PATENT DOCUMENTS

JP 2-72526 A 3/1990

* cited by examiner

*Primary Examiner*—James R. Scott
(74) *Attorney, Agent, or Firm*—Sughrue Mion, PLLC

(57) ABSTRACT

A pushbutton switch includes an upper case (1) having a cylinder portion (1*b*) and a button (3) which is capable of a sliding motion along the cylinder portion (1*b*). A rotor (5) having a flange (1*a*) at the bottom thereof performs a sliding reciprocating motion while rotating in the predetermined direction responding to reciprocating motion of the button (3) by setting the axis of rotation as the long axis of the cylinder portion (1*b*). A contact segment (4) is inserted in the rotor 5 and stationary terminals (2*a*, 2*b*, and 2*c*) oppose the contact segment (4). The rotor (5) carries out a predetermined angle rotation for every reciprocating motion of the button (3) to effect alternating ON/OFF switching action. Arms (4*a*) curve toward stationary terminals (2*a*, 2*b*, and 2*c*) and elastically buckle in accordance with the variation in distance between stationary terminals (2*a*, 2*b*, and 2*c*) and the rotor(5) when the rotor (5) performs a sliding reciprocating motion.

7 Claims, 20 Drawing Sheets

PUSHBUTTON SWITCH

TECHNICAL FIELD OF THE INVENTION

The present invention relates to a pushbutton switch, and more specifically, a pushbutton switch having a contact point, which is activated by an axially disposed cam.

BACKGROUND OF THE INVENTION

Various forms are proposed as a pushbutton switch in which a contact point is activated by an axially disposed cam.

For example, a pushbutton switch as shown in FIG. 13 to FIG. 19 is proposed in JP-A-2-72526. FIG. 13 illustrates an exploded perspective view of a pushbutton switch defined in JP-A-2-72526. It includes an actuator housing 101 having a substantially cylindrical passage 101*a* in which a pushbutton 100 and the like, as below-mentioned, is contained. The pushbutton 100 has a cylindrical-shaped cylinder portion 100*a* (FIG. 15B) which is engaged with the passage 101*a*. An actuator cam follower 102 has a square shaped internal cavity portion 102*a* with a square columnar shape inside, where a rotary contact carrier 104 (as hereinafter referred) is fitted loosely onto. An actuator return spring 103 which is interposed between the actuator cam follower 102 and the rotary contact carrier 104, as described below, is intended to upwardly urge the actuator cam follower 102, or downwardly urge the rotary contact carrier 104. The rotary contact carrier 104, which has a stem 104*a* fitted loosely onto the square shaped internal cavity portion 102*a*, is rotated in the flat surface portions according to a predetermined angle rotary motion of the actuator cam follower 102 to allow the rotary contact element 105 in the bottom to effect an electric connection as referred below and electrical isolation of the electric contact elements 106*a*, 106*b*, and 106*c* as referred below, and performs alternating ON/OFF switching action. A stationary contact housing portion 106 has electric contact elements 106*a*, 106*b*, and 106*c* arranged in predetermined form. A coveting part 107 covers the bottom of the pushbutton switch.

The main element members of the pushbutton switch described in JP-A-2-72526 will be discussed hereinafter.

FIG. 14 is a sectional view of an actuator housing 101. A cylindrical passageway 101*a* with which a pushbutton 100 is engaged, is formed in the actuator housing 101. Pushbutton guides 101*b* in the profile of a projection along the longitudinal direction are formed at an equal spacing in the inner surface of this passage 101*a*. Adjoining pushbutton guides 101*b* and 101*b* are separated by guide portions 101*c* which are recessed grooves. The lower ends of such pushbutton guides 101*b* are formed in slant surfaces, and serve as cam surfaces 101*d*.

FIG. 15A is a side view of a pushbutton 100, and FIG. 15B is a sectional view of a pushbutton 100. The pushbutton 100 is a hollow cylindrical member having a cylindrical-shaped cylinder portion 100*a* inside thereof. Four slide guides 100*b* (only three of them are displayed in FIG. 15A) are disposed in lower end portions at 90-degree-intervals extending outwardly in the radial direction. These slide guides 100*b* are slidably engaged with the guide recess portions 101*c* (FIG. 14), and guide a pushbutton 100 linearly at the time of reciprocating motion of the pushbutton 100. The lower end portions of a pushbutton 100 are formed into saw teeth. Each saw tooth 100*c* consists of apex 100*d* and slant-shaped cam sides 100*e* which surround the apex 100*d*. Eight saw teeth 100*c* are disposed in the lower end portions of the pushbutton 100, equally spaced at 45 degree intervals.

As shown in FIG. 15B, the central axis of the slide guide 100*b* (FIG. 15) is provided to pass through the apex 100*d* of each saw tooth 100*c*.

FIG. 16A is a side view of an actuator cam follower 102, and FIG. 16B is a sectional view of the actuator cam follower 102. The actuator cam follower 102 is a hollow cylindrical member which has a circular opening and a square columnar shaped internal cavity portion 102*a* in the square columnar shape inside thereof, as shown in FIG. 16B.

The actuator cam follower 102 is a member slidably fittingly mounted into the cylindrical cylinder portion 100*a* (FIG. 15B). Also, predetermined angle rotation is carried out by the cam action as hereinafter referred, while performing a vertical movement along with the reciprocating motion of the pushbutton 100, so that a translating mechanism that converts linear motion of a pushbutton to rotary motion is achieved.

The lower part of actuator cam follower 102 is adapted to a diameter expansion part 102*b*, the diameter of which is expanded. A saw tooth 102*c*, which has the same form as a saw tooth 100*c* (FIGS. 15A and 15B), is provided at the upper end of this diameter expansion part 102*b*. The saw tooth 102*c* consists of the apex 102*d* and slant-shaped cam sides 102*e* which surround the apex 102*d*. Further, from a diameter expansion part 102*b* of an actuator cam follower 102, cam follower guides 102*f* extend outwardly in the radial direction spaced at a 90 degree interval.

The central axis of the slide guides 100*b* (FIG. 15A) of the pushbutton 100 are provided to pass through the apex 100*d* of each saw tooth 100*c*, whereas, the central axis of the cam follower guides 102*f* are provided to be offset from the apex 102*d* of the saw tooth 102*c* slightly.

FIG. 17 is a side view of a rotary contact carrier 104. The rotary contact carrier 104 is a member including a rotary contact element 105 which consists of a square columnar stem 104*a* formed in a tapered twisted end in the upward direction, and a substantially circular metal plate provided in the bottom of this stem 104*a*.

A rotary contact carrier 104 is a member wherein a stem 104*a* is slidably engaged with a square shaped internal cavity portion 102*a* (FIG. 16B). Rotation of an actuator cam follower 102 accompanying reciprocal operation of a pushbutton 100 is transmitted to the stem 104*a* through the square shaped internal cavity portion 102*a*. Then, a rotary contact element 105 carries out predetermined angle (predetermined-number-step) rotation with the result that the electric connection and electrical isolation of the electric contact elements 106*a*, 106*b*, and 106*c*, which are the electrodes provided in the stationary contact housing portion 106 (FIG. 13), are affected. Then, alternate ON/OFF switching action is affected.

Incidentally, lubricant, such as grease, is applied to the inner part of the stationary contact housing 106 to thereby allow electric contact elements 106*a*, 106*b*, and 106*c* to be in less friction with a rotary contact element 105 at the time of sliding rotation.

Next, operation of a pushbutton switch disclosed in a JP-A-2-72526 will be discussed.

FIG. 18 is a schematic diagram, wherein cam mechanism constituted by an actuator housing 101, a pushbutton 100, and an actuator cam follower 102 is deployed in a plane view.

FIG. 18A is a diagram showing the state where the pushbutton 100 is not pressed. The pushbutton 100 and the actuator cam follower 102 are urged upwardly by an actuator return spring 103 (not shown) and are fixed. Hereafter, this state is referred as upper dead center. In the upper dead center, slide guides 100*b* (FIG. 15A and FIG. 15B) and cam follower guides 102*f* (FIG. 16) are engaged with guide recess portions 101*c* (FIG. 14). Further, a saw tooth 100*c* of a pushbutton 100 and a saw tooth 102*c* of an actuator cam follower 102 contact with each other by mutual cam sides 100*e* and 102*e* with a state that the phase thereof is offset. This is because, as described hereinbefore, in a pushbutton 100, the central axis of slide guides 100*b* is provided to pass through the apex 100*d* (FIG. 15A), whereas in an actuator cam follower 102, the central axis of the cam follower guides 102*f* is provided to be offset from the apex 102*d* of a saw tooth 102*c* (FIG. 16A).

When a pushbutton 100 is pressed to descend and lower, dead center is reached, resisting the opposing force of an actuator return spring 103, and the actuator cam follower 102 is guided by guide recess portions 101*c*, and moves below. When projections of cam follower guides 102*f* cross over the tip part of slant cam surfaces 101*d* in due course, the actuator cam follower 102 is separated from the guidance of guide recess portions 101*c* to slide on cam side 100*e* by the opposing force of the actuator return spring 103, and moves (rotates) by distance X (leftward in the figures) to enable a saw tooth 100*c* of a pushbutton 100 and a saw tooth 102*c* of an actuator cam follower 102 to be engaged with a state of the phase thereof to be in agreement (FIG. 18B). When the phase of a saw tooth 100*c* and a saw tooth 102*c* is in agreement, sound is caused by the pressing (a click of a latch) as the cam sides 100*e* and cam sides 102*e* collide.

According to FIG. 19, when the pushbutton 100 is released after the termination of a button-pressing action of the pushbutton 100, the pushbutton 100 and the actuator cam follower 102 go up rapidly by an opposing force of an actuator return spring 103. By this rise, the cam follower guide 102*f* collides with slant cam surfaces 101*d* to move (rotate) by distance Y, which is bigger than distance X, leftward in the figure, sliding on the cam surfaces 101*d*. At the time of the rotation of this distance Y, a rotary contact carrier 104 engaged with an actuator cam follower 102 is rotated greatly to effect the ON/OFF switching action.

A cam follower guide 102*f*, being engaged with guide recess portions 101*c*–B in due course, goes up rapidly while guided by a guide recess portions 101*c*–B, and results in upper dead center. In the upper dead center, when cam sides 100*e* and cam sides 102*e* collide, the return sound "a click of a latch" occurs.

According to FIG. 19, when a pushbutton 100 is released after the termination of a button-pressing action of a pushbutton 100, a pushbutton 100 and an actuator cam follower 102 go up rapidly by the opposing force of the actuator return spring 103. By this rise, a cam follower guide 102*f* collides with slant cam surfaces 101*d*, and moves (rotates) leftward by bigger distance Y than distance X sliding on cam surfaces 101*d*. At the time of the rotation of this distance Y, the rotary contact carrier 104 engaged with the actuator cam follower 102 rotates greatly, so as to effect the ON/OFF switching action.

A cam follower guide 102*f* will engage with guide recess portions 101*c*–B in due course, going up rapidly while guided by guide recess portions 101*c*–B, and results in upper dead center. In the upper dead center, when cam sides 100*e* and cam sides 102*e* collide, it sounds like "a click of a latch".

According to an important feature of the invention disclosed in JP-A-2-72526, alternating position ON/OFF of a switch is defined when a pushbutton 100 returns to upper dead center from lower dead center. If this is checked with a user's movement, when the user presses a pushbutton 100, the pressing sound of "a click of a latch" can be heard first. However, in this stage, alternating ON/OFF switching position is not defined, but if a button is pressed as far as reaching the lower dead center and a hand is lifted, the return sound "a click of a latch" can be heard after that.

Thus, a user's feeling of operation and alternating ON/OFF position of the pushbutton switch disclosed in JP-A-2-72526 do not match. Therefore the user may have a sense of incongruity.

This has posed a technical problem to be solved. This invention provides a pushbutton switch wherein alternating ON/OFF position of a switch is defined simultaneously with a press sound of the press button. In addition, in the reciprocal motion of the press button, alternating ON/OFF position of the switch can be effected at any time at will.

Also, a pushbutton switch disclosed in JP-A-2-72526 generates a return sound of "a click of a latch" by collision of cam sides 100*e* and cam sides 102*e* in the upper dead center caused by the opposing force of an actuator return spring 103 when a pushbutton 100 returns to the upper dead center from the lower dead center.

Hereupon, a pushbutton switch disclosed in JP-A-2-72526 has only one actuator return spring 103 to urge two members, as a pushbutton 100 and an actuator cam follower 102. This necessitates the pushbutton switch to employ a spring with large spring constant and strong opposing force. Therefore, a problem arises that the return sound emitted by the collision of cam sides 100*e* and cam sides 102*e* is loud.

These are the problems to be solved by this invention.

SUMMARY OF THE INVENTION

The present invention is provided to overcome the above discussed problems in the below-mentioned manner.

The invention provides a pushbutton switch that includes a case having an substantially cylindrical-shaped cylinder portion. A substantially cylindrical button is fittingly mounted into the cylinder portion so as to be capable of a sliding motion along the cylinder portion. A substantially cylindrical rotor having a flange at the bottom performs a sliding reciprocating motion along the cylinder portion while carrying out predetermined angle rotation in the predetermined direction by setting the rotation axis as the long axis of the cylinder portion. A substantially toroidal plate contact segment is inserted by the rotor to be latched by the rotor. A plurality of stationary terminals are provided in the case opposed to the contact segment.

The rotor carries out predetermined angle rotation for every reciprocal motion of the button, then alternates ON/OFF switching positions which repeat the ON state where electrical contacts are effected between the fixed terminals and the contact segment, and the OFF state where electrical contacts are broken.

Tabular arms, which are formed into a curving shape in the direction of stationary terminals and contact with the stationary terminals spaced at predetermined intervals, are provided in the outer periphery portion of the contact segment. The arms are buckled elastically to retain the contact between the stationary terminals and the contact segment according to variation in distance from the stationary terminals to a rotor generated at the time of the reciprocal sliding of the rotor.

The alternating ON/OFF switching position of the pushbutton switch is defined by making a button to move reciprocately to cause a rotor to carry out predetermined angle rotation by changing the contact segment provided for the rotor into the state where electrical connection is broken from the state where electrical connection is made between stationary terminals. A pushbutton switch according to this invention provides a pushbutton switch in which by a button-pressing action, even if the distance between a rotor (contact segment) and stationary terminals spreads, the arms provided in the contact segment arc buckled so that electrical contact between stationary terminals and the contact segment may be retained. Hence, it becomes possible by changing the degree of deflection (curvature) of the arms to set up the timing of contact/non-contact state between stationary terminals and the arm at any time at will in a button-pressing action.

Also, it becomes possible by changing arrangement of stationary terminals to set up the timing of the alternating ON/OFF switching position of a pushbutton switch at any time at will in return operation of the button.

The invention may also include a first spring which urges the rotor upwardly and a second spring which urges the button upwardly.

Here, a pushbutton switch urges a button and a rotor upwardly with an independent spring respectively (a first spring and a second spring). Therefore, the spring with a smaller spring constant than a conventional one can be used as each spring, so that it becomes possible for the return sound emitted when the rotor urged by the first spring at the time of return operation of the button collides with other components to be smaller than a conventional pushbutton switch.

Further, even when a rotor urged by the first spring at the time of return operation of a button collides with other components, a part of this collision power is spent on making the arms of the contact segment provided for the rotor buckle between stationary terminals (arms work as a cushion so to speak). This makes it possible to weaken the collision power when a rotor collides with other components resulting in allowing the return sound to be smaller than a conventional pushbutton switch.

Projections may be arranged in the longitudinal direction, separated mutually by the guide recess portions in an inner periphery of the cylindrical portion spaced at predetermined intervals. The lower end of each projection serves as slant cylinder portion cam sides. Ribs which are fitted loosely into the guide recess portions are formed in the outer periphery of the lower ends of the button. The lower ends of the ribs constitute slant button cam sides having substantially the same inclination with the cylinder portion cam sides. Projections, which are fitted loosely into the guide recess portions, are formed in the upper ends of the rotor, and the upper ends of the projections serve as slant rotor cam sides having substantially inverse inclination with respect to the button cam sides. The cam sides perform a sliding movement to the cylinder portion cam sides by being pressed along the guide recess portions at the time of reciprocating motion of the button. The rotor cam sides carry out sliding movement along the button cam sides so that engagement with another adjoining guide recess may be achieved.

Ribs of the button and projections of a rotor are fitted loosely into the guide recess portions provided in inner peripheral surface of the cylinder portion. When a button-pressing action is performed, button cam sides provided in the lower end portions of the ribs are caused to press rotor cam sides provided in the upper ends of projections of the rotor. Along with this, the button .and the rotor perform a sliding movement downwardly along the guide recess portions. When projections of the rotor cross over the tip portions of slant cylinder portion cam sides in due course, the rotor cam sides slidingly carry out a predetermined angle rotation to move on the cylinder portion cam sides. At this time, "a click of a latch" is emitted.

When a button returns thereafter, rotor cam sides which were moving on the cylinder portion cam sides slide on the cylinder portion cam sides to engage with guide recess portions which are adjacent to above described guide recess portions while carrying out a predetermined angle rotation. At this time, a return sound of "a click of a latch" occurs.

Projections for a prevention of an excessive rotation, which are fitted loosely into the guide recess portions, may be provided along the longitudinal direction of the outer peripheral surface of the button.

These projections for a prevention of an excessive rotation which are fitted loosely into the guide recess portions of the cylinder portion are provided on the outer peripheral surface of a button. Whereby, a button always slides along guide recess portions, which obviates the disadvantage that when the button is excessively pressed, ribs of the button cross over the tip part of the cylinder portion cam sides, resulting in being rotated inadvertently to ride over cylinder portion cam sides.

A guide pole may extend along the central axis of the button from the lower end portion of the button. Then, in the case facing this guide pole, a cylindrical insertion portion having an opening, which has substantially the same diameter with that of guide pole, is provided.

A guide pole is extending from the lower end portion of the button, so as to be inserted in the insertion portion provided in the bottom of a case when a button-pressing action is performed. The guide pole is moved as guided by this insertion portion, in order to suppress vertically caused slight movement with respect to the central axis of the button.

Flat surface portions may be provided within the case, keeping contact with the contact segment. The terminal portions for connecting the external wiring to the pushbutton switch may be provided, wherein the terminal portions are extending downwardly from the flat surface portions into a shape of the letter "U", as well as curving in spaced apart relation from the flat surface portions.

The terminal portions are curving from the flat surface portions into a shape of the letter "U", and also are formed into a curving shape in spaced apart relation from the flat surface portions. Whereby, reliable external wiring can be maintained, irrespective of the form of the external wiring inserted in the terminal portions.

The stationary terminals are connected to a printed circuit board 9 (See FIG. 20), thereby providing for alternative electrical connections to a variety of applications.

PREFERRED EMBODIMENT OF THE INVENTION

Figure 1:
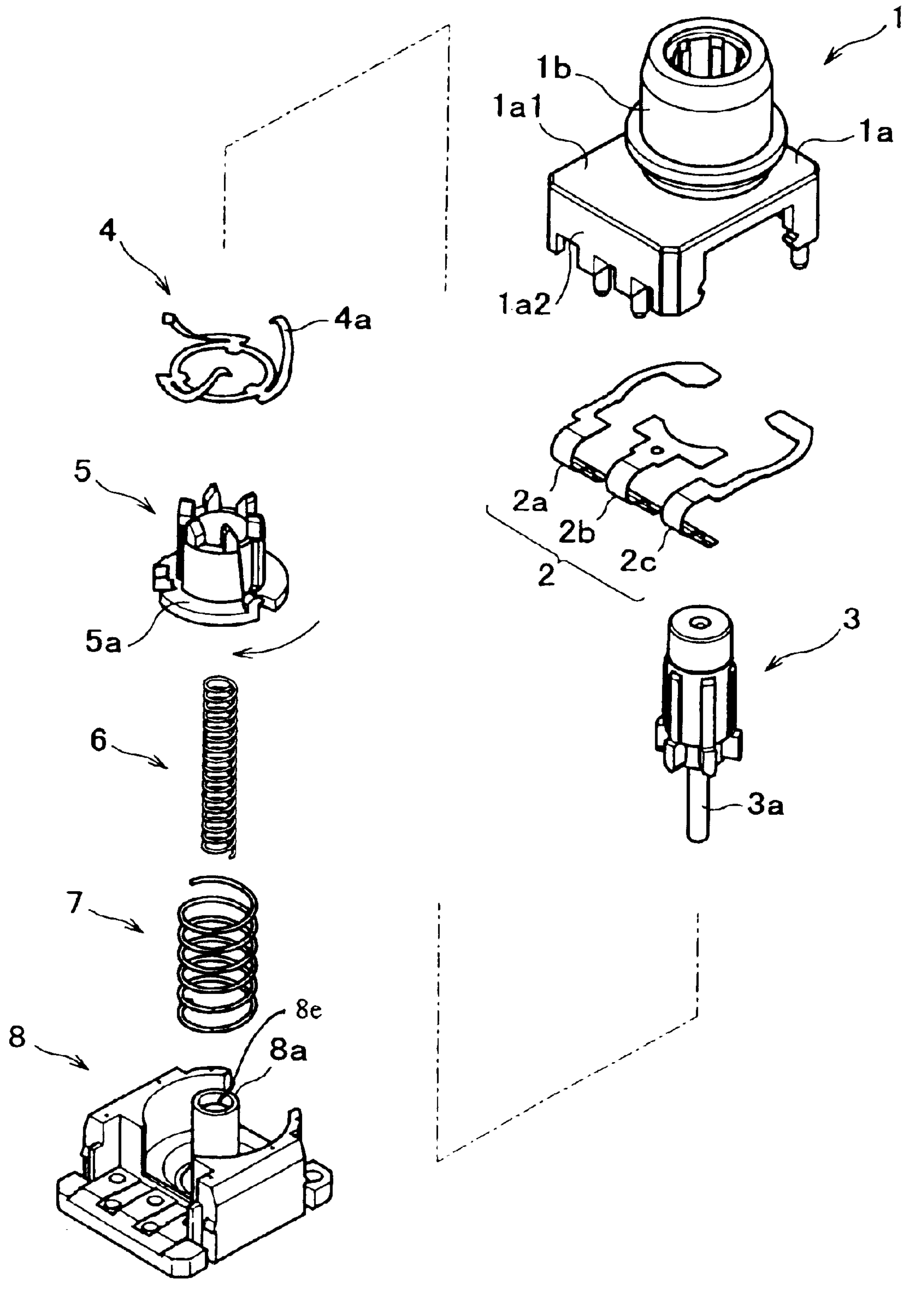
FIG. 1 is an exploded perspective view of a pushbutton switch of this invention.

Hereinafter, an exemplary embodiment of this invention will be discussed in conjunction with the drawings as needed.

A pushbutton switch of this invention will be explained with reference to FIG. 1. A pushbutton switch according to the invention comprises a substantially square housing 1*a*; an upper case 1 having a substantially cylindrical shaped cylinder portion 1*b* provided in this housing 1*a*; three stationary terminals 2*a*, 2*b*, and 2*c* made up of conductive material which contact with a contact segment 4 as referred below; a button 3 which assumes a substantially cylindrical shape and adapted to be fittingly mounted into the cylinder portion 1*b* so as to be capable of a sliding motion in the vertical direction along the inner surface of the cylinder portion 1*b* and a guide pole 3*a* is extending from the bottom portion thereof. The contact segment 4 which assumes a substantially toroidal plate form is made up of conductive material latched by the flange 5*a* of the rotor 5 as referred below and has tabular arms 4*a* which keep contact with the stationary terminals 2*a*, 2*b*, and 2*c* and is formed into a curving shape on the outer periphery portion in the direction of the stationary terminals 2*a*, 2*b*, and 2*c* spaced at predetermined intervals. The substantially cylindrical rotor 5 has the flange 5*a* at the bottom thereof which performs sliding reciprocating motion along the cylinder portion 1*b* while carrying out predetermined angle (predetermined step) rotation in the predetermined direction by setting the axis of rotation as the long axis of the cylinder portion 1*b*. The second spring 6 passes through the cylinder portion of this rotor 5 and urges the button 3 upwardly, and the first spring 7 surrounds this second spring 6 and urges coaxially provided rotor 5 upwardly.

A lower case 8 is provided with an opening 8*e* in a cylindrical insertion portion 8*a* so that a guide pole 3*a* may be inserted in the bottom thereof;

Operation of a pushbutton switch according to this invention will be briefly explained. Incidentally, in the following explanation, "upper dead center" refers to a state when the button 3 is not pressed, and "lower dead center" refers to the state where a button 3 is pressed to the point where the button 3 is not allowed to move down any further.

In a pushbutton switch in a manner of alternating ON and OFF positions, when a button 3 is moved downwardly from the upper dead center, the rotor 5 will also move downwardly along with the button 3. At this time, an opposing force of the second spring 6 and an opposing force of the first spring 7, which urges the rotor 5, is applied to the button 3.

When the rotor 5 moves downwardly, distance between the contact segment 4 latched by the rotor 5 and stationary terminals 2*a*, 2*b*, and 2*c* spreads. However, the contact segment 4 includes arms 4*a* which are formed into a curving shape in the direction of stationary terminals 2*a*, 2*b*, and 2*c*. Therefore, by buckling, the arms 4*a* absorb this expansion to permit the contact segment 4 and stationary 2*a*, 2*b*, and 2*c* to be contacted and retained as such state. Accordingly, alternating ON/OFF state of a switch is maintained as such a state also.

When the button 3 moves further downwardly, a cam mechanism provided in the cylinder portion 1*b*, the button 3 and the rotor 5 work to effect the rotor 5 to carry out predetermined angle rotation simultaneously with a pressing sound of "a click of a latch" as indicated by the arrow in FIG. 1. At this time, the contact segment 4 is also caused to be rotated along with the rotor 5, leading to change the state of the contact between stationary terminals 2*a*, 2*b*, and 2*c* and the contact segment 4. Thereby alternating ON/OFF switching motion is effected. Incidentally, the cam mechanism will be described fully hereinbelow.

Further, at this time the guide pole 3*a* is under the state of being inserted in the insertion portion 8*a* provided in the lower case 8. Then, the guide pole 3*a*, that is, the button 3 performs a sliding motion in the vertical direction while guided by the insertion portion 8*a* to allow the slight movement of the button 3 in the horizontal direction to be suppressed.

When the button 3 reaches the lower dead center and the pressing force is removed (if a finger is lifted from a button 3), the button 3, receiving an opposing force from the second spring 6 for urging the button 3, and the first spring 7 for urging the rotor 5, starts a returning operation and moves upwardly. The rotor 5, receiving the opposing force of the first spring 7, presses the button 3 and the contact segment 4 upwardly. Along with this, the rotor 5 per se also rises. When the rotor 5 rises to some extent, the cam mechanism works and the rotor 5 is further rotated as indicated by the arrow in the drawing and fixed with a return sound "a click of a latch" emitted simultaneously. After the rotor 5 is fixed, the button 3 is moved upwardly by the opposing force of the second spring 6 only, then returns to the original position (upper dead center) before the button 3 is pressed.

Subsequently, each component which constitutes a pushbutton switch of this invention will be described more fully hereinbelow.

Figure 2A:
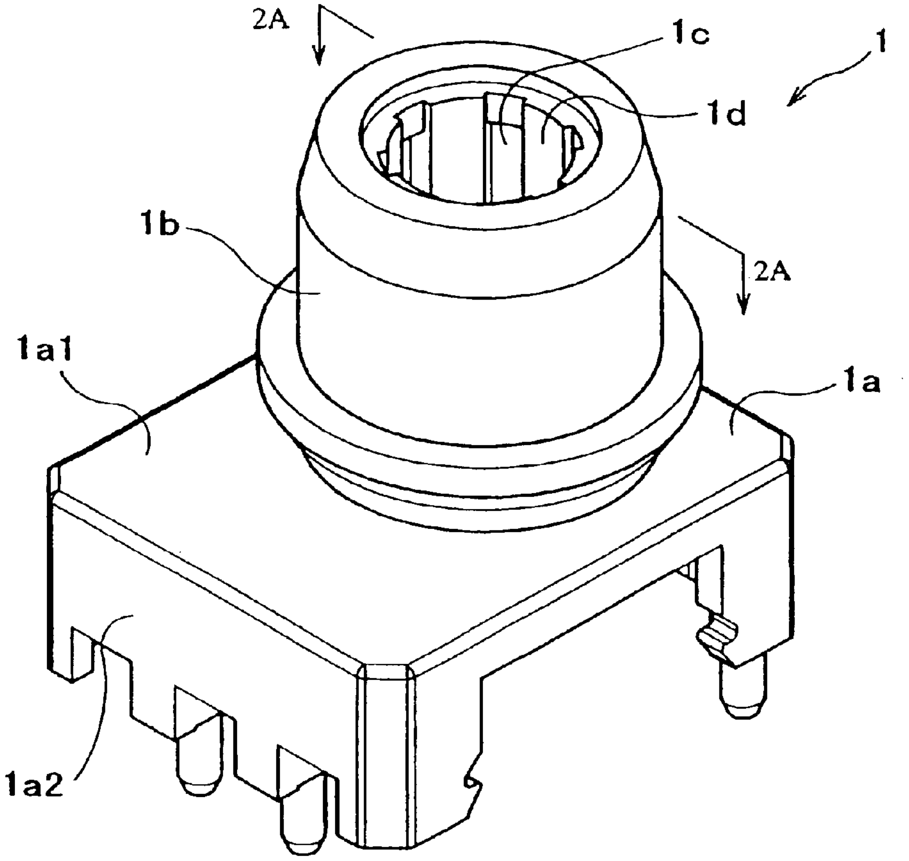
FIG. 2A is a perspective view an upper case and FIG. 2B is a sectional view taken along the line 2A—2A.
Figure 2B:
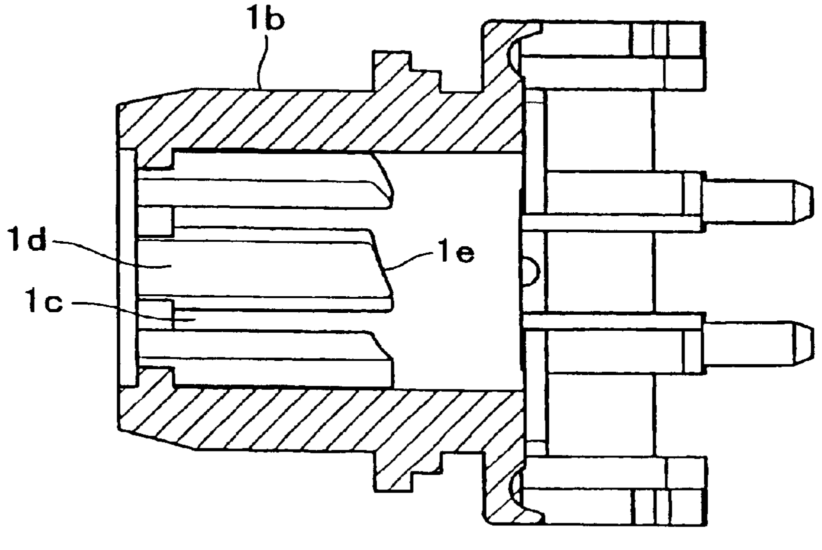

FIG. 2A is a perspective view of an upper case 1, and FIG. 2B is a sectional view of FIG. 2A taken along the line 2A—2A.

The upper case 1 consists of a rectangular parallelepiped-shaped housing 1*a* and a cylindrical-shaped cylinder portion 1*b*. The housing 1*a*consists of a horizontally flat upper end surface 1*a*1 and side walls 1*a*2 extending downwardly perpendicular to the horizontally flat upper end surface 1*a*1. In the inner peripheral surface of the cylinder portion 1*b*, six projections Id which are mutually separated by the guide recess portions 1*c* and disposed spaced at 60 degree intervals in the longitudinal direction of the cylinder portion 1*b* are formed. Here, lower end portions of the respective projections 1*d* constitute cylindrical slant cam sides 1*e*.

A cylinder portion 1*b* serves as a guide to lead a vertical reciprocating motion of the button 3 (FIG. 4) as will be described hereinbelow. Also, cylinder portion cam sides 1*e* provided in the lower end portions of the projections 1*d* serve so as to cause the rotor 5 (FIG. 6), as will be described below, to be rotated in the circumferential direction.

Figure 3A:
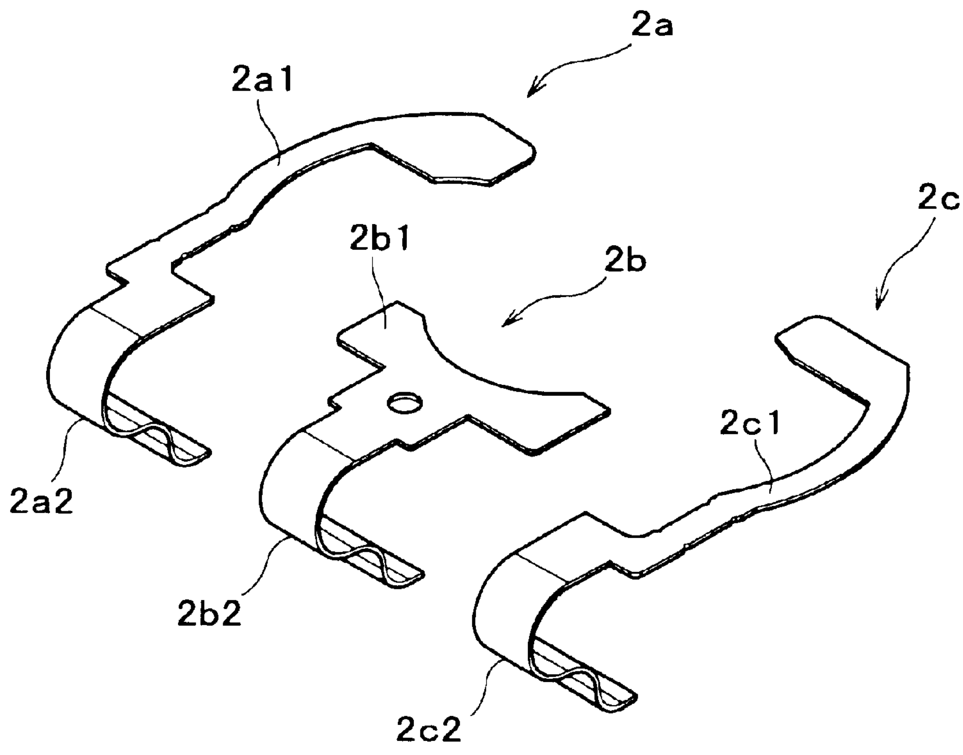
FIG. 3A is a side view of stationary terminals A.
Figure 3B:
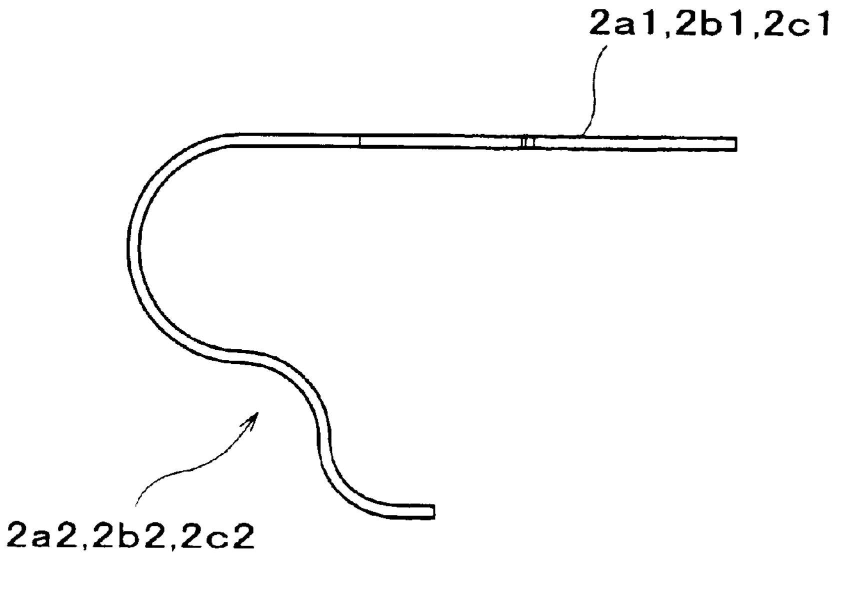
FIG. 3B is a side view of terminal portions of the stationary terminals.

FIG. 3A is a perspective view of terminal portions 2*a*2, 2*b*2, and 2*c*2, and FIG. 3B is a side view of the stationary terminals 2*a*, 2*b*, and 2*c*.

The stationary terminals 2*a*, 2*b*, and 2*c* are equipped in the back side of the upper end surface 1*a*1 (FIG. 2A), and consist of flat surface portions 2*a*1, 2*b*1, and 2*c*1 and terminal portions 2*a*2, 2*b*2, and 2*c*2 having an external wiring interposed therebetween by cooperation of the lower case 8 as referred hereinafter.

The stationary terminals 2*a*, 2*b*, and 2*c* are constituted of three terminals, that is, the first terminal 2*a*, the central terminal 2*b*, and the second terminal 2*c*. When a pushbutton switch is activated, two external wirings are adapted to be arranged such that one of them is connected to the central terminal 2*b*, and the remaining one is connected to either the first terminal 2*a* or the second terminal 2*c*. Incidentally, stationary terminals 2*a*, 2*b*, and 2*c* are made up of conductive components, such as copper.

The flat surface portions 2*a*1, 2*b*1, and 2*c*1 are molded into a peculiar shape respectively. Flat surface 2*b*1 of the central terminal 2*b* is adapted to be formed into a shape making up the situation such as to retain a contact state between the arms 4*a* and the contact segment 4 all the time irrespective of the alternating ON/OFF positions of the switch. Also, flat surface portions 2*a*1 and 2*c*1 of the first terminal 2*a* and the second terminal 2*c* are formed into a shape making up the situation such as to repeat the alternating switching position of ON/OFF for every predetermined angle rotation of arms 4*a* of the contact segment 4. More specifically, ON is a state where electrical contact with arms 4*a* is effected and OFF is a state where electrical contact is broken.

Also, terminal portions 2*a*2, 2*b*2, and 2*c*2 are extending downwardly into a shape of the letter "U" from the flat surface portions 2*a*1, 2*b*1, and 2*c*1, and are formed into a curving shape in spaced apart relation from the flat surface portions 2*a*1,2*b*1, and 2cl. By employing this configuration in the terminal portions 2*a*2, 2*b*2, and 2*c*2, these terminal portions 2*a*2, 2*b*2, and 2*c*2 absorb the variation in the external wiring by assuming a buckling form of the terminal portions 2*a*2, 2*b*2, and 2*c*2 per se even when more or less variation exists in the diameter of external wiring or the tip part of external wiring. Reliable external wiring can be thus interposed therebetween. Incidentally, by way of example, the central terminal 2*b* is adapted to serve as a COM terminal, and either one of the first or second terminals 2*a*, 2*c* is adapted to serve as a dummy terminal.

Figure 4A:
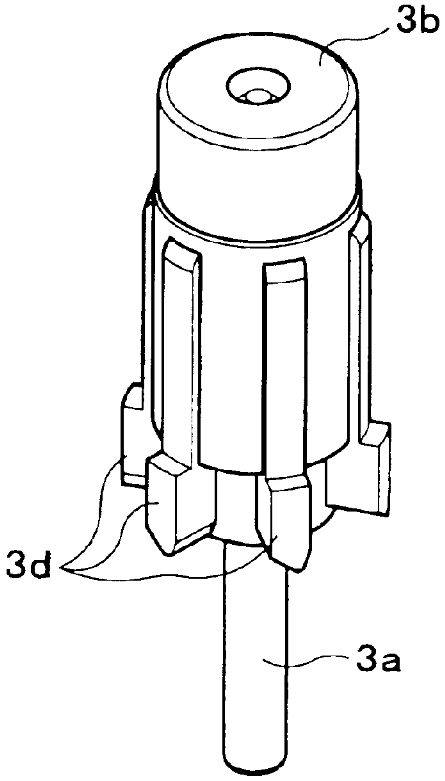
FIG. 4A is a perspective view.
Figure 4B:
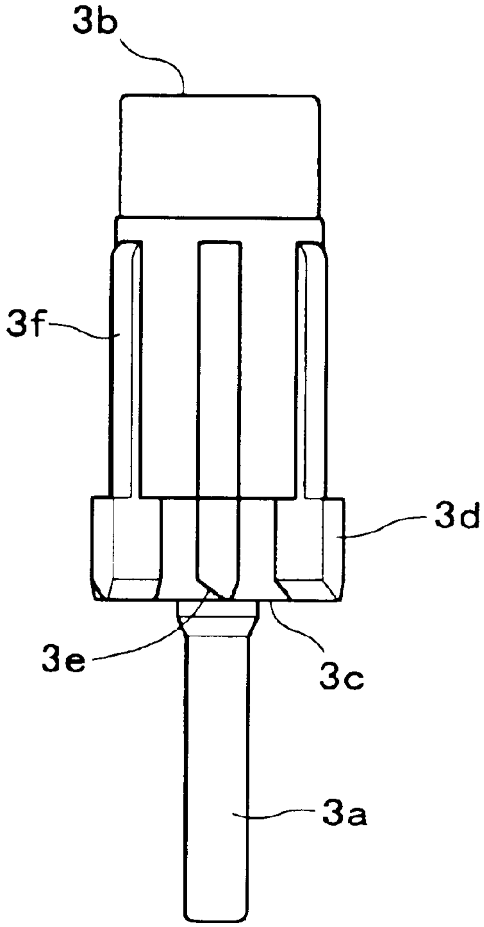
FIG. 4B is a side view, of a button.

FIG. 4A is a perspective view of the button 3, and FIG. 4B is a side view of the button 3.

The button 3 is a substantially cylindrical member and an upper end surface 3*b*is intended to be the press surface suitable for a pressing-button action. Also, the guide pole 3*a* as described hereinbefore extends downwardly from the center of the lower end surface 3*c*. Further, six ribs 3*d* which are fitted loosely into the guide recess portions 1*c* of the cylinder portion 1*b* and overhang outwardly in the radial direction are provided so as to be spaced at 60 degree intervals on the outer periphery surface of the lower end surface 3*c*. Lower end portions of the ribs 3*d* are intended to be slant button cam sides 3*e* which are inclined substantially in the same direction with the above-described cylinder portion cam sides 1*e* (FIG. 2B). Also, projections 3*f* for prevention of an excess rotary motion are provided on the outer periphery of the button 3, following the upper end of the ribs 3*d*. The projections 3*f* for prevention of an excess rotary motion are shorter than the ribs 3*d*, and are fitted loosely into the guide recess portions 1*c* (FIG. 2B) along with the ribs 3*d*.

The button 3 is a member adapted to be fittingly mounted into the above-described cylinder portion 1*b* (FIG. 2B). The ribs 3*d* and projections 3*f* for prevention of an excess rotary motion are fitted loosely into the guide recess portions 1*c* disposed at 60 degree intervals in the cylinder portion 1*b* (FIG. 2B). The button 3 performs a linear reciprocating motion along the guide recess portions 1*c* (FIG. 2B).

The projections 3*f* for a prevention of an excess rotary motion are intended to serve as guides to lead a button 3 up and down. Namely, under the circumstances that the button 3 is pressed to excess and the ribs 3*d* are separated from the guide recess portions 1*c* (FIG. 2B), the projections 3*f* for a prevention of an excess rotary motion are engaged with the guide recess portions 1*c*, so that the movement of the button 3 is limited to up and down only. Thus, a malfunction such that in case the ribs 3*d* separate from the guide recess portions 1*c* (FIG. 2B), the button 3 is circumferentially rotated to ride over the projections 1*d* (FIG. 2B) of the cylindrical portion 1*b* is obviated.

Figure 5A:
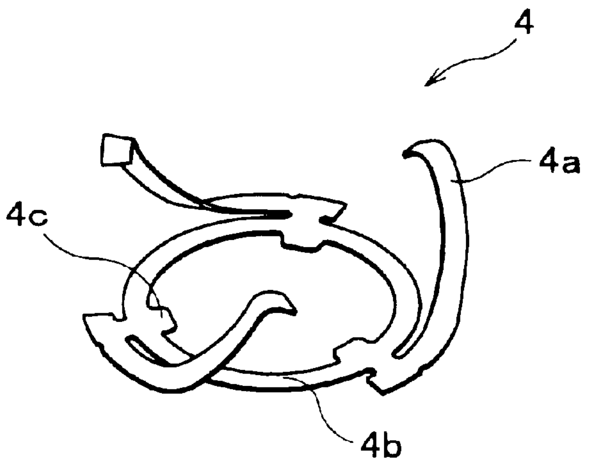
FIG. 5A is a perspective view.
Figure 5B:
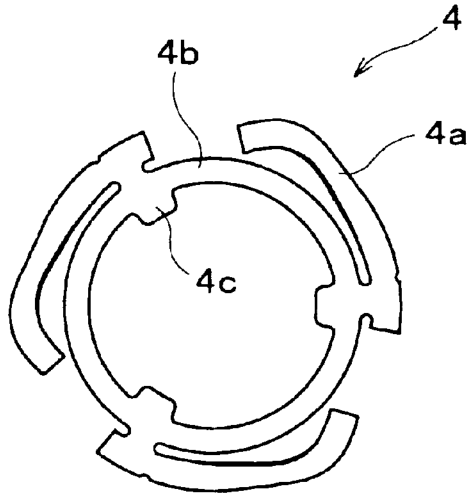
FIG. 5B is a front view.
Figure 5C:
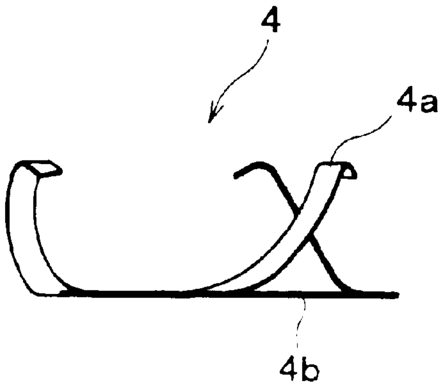
FIG. 5C is a side view, of the contact segment.

FIG. 5A is a perspective view of the contact segment 4, FIG. 5B is a front view of the contact segment 4, and FIG. 5C is a side view of the contact segment 4.

A contact segment is a substantially toroidal plate member which consists of conductive components such as copper, and three arms 4*a* provided on the toroidal base 4*b* and outer periphery of the toroidal base 4*b* spaced at 120 degree intervals. The arms 4*b* are obliquely upwardly (in the direction of stationary terminals 2*a*, 2*b*, and 2*c*) extending (FIG. 5C) in such a manner as going along the outer periphery of the base 4*b*viewed from the front, and assume a curving form viewed from the side at the connection part with the base 4*b*. The arms 4*a* consist of the material having flexibility, which contributes to its buckling property like a leaf spring which are free to buckle when a force is applied from upward and return to the original form when this force is removed.

In this manner, the contact segment 4 has arms 4*a* which are free to buckle like a leaf spring. In the process that the button 3 which is pressed to the lower dead center (FIGS. 4A, 4B) returns to the upper dead center, the rotor 5 (FIGS. 6A, 6B) collides with other members by the opposing force and a return sound of "a click of a latch" is emitted. However, in a pushbutton switch according to this invention, the arms 4*a* of the contact segment 4 buckle and serve as a cushion. This enables the return sound to be smaller compared to a conventional pushbutton switch.

Figure 6A:
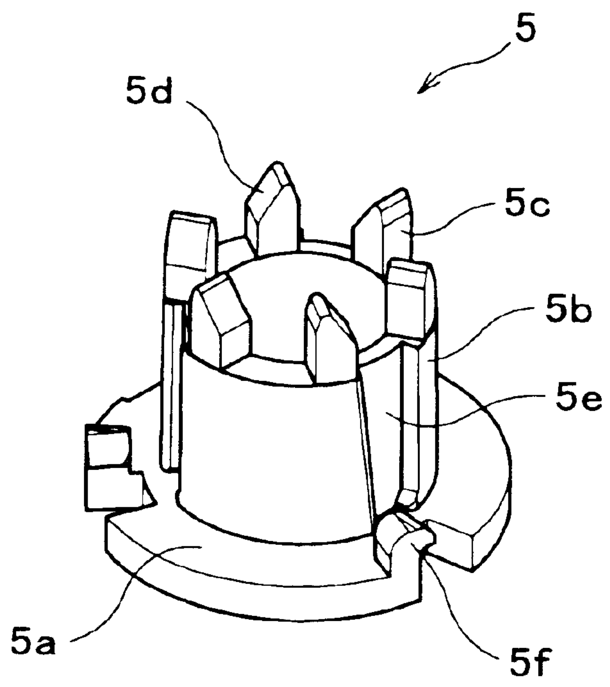
FIG. 6A is a perspective view.
Figure 6B:
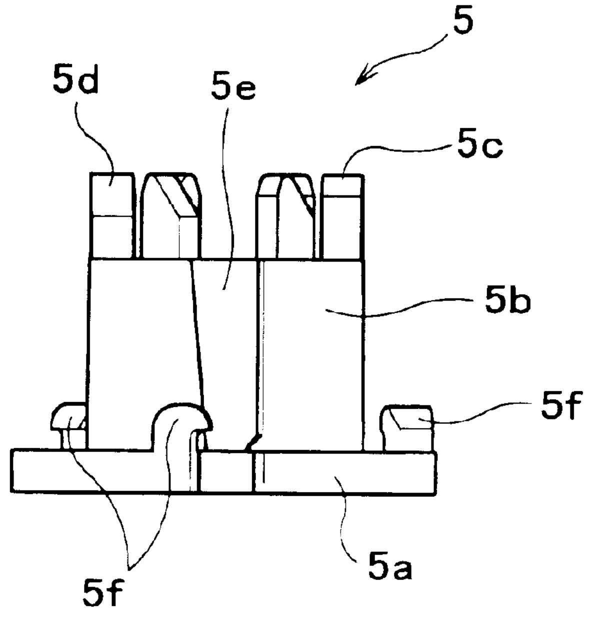
FIG. 6B is a side view, of a rotor.

Also, in an inner periphery of the base 4*b*, latching portions 4*c* extending for engagement with recesses 5*e* of the rotor 5 (FIGS. 6A, 6B) as explained below in a manner as to cause the contact segment 4 to be latched by the rotor 5 (FIGS. 6A, 6B).

The contact segment 4 is a member which is latched by the rotor 5 (FIG. 6A and FIG. 6B) so as to be rotated as the rotor 5 (FIG. 6) rotates. Alternating ON/OFF switching action is thus effected. The operation of this contact segment 4 will be explained along with the rotor 5 (FIGS. 6A, 6B) as described hereinbelow.

FIG. 6A is a perspective view of the rotor 5, and FIG. 6B is a side view of the rotor 5.

The rotor 5 is a substantially cylindrical member which has a cylindrical main part 5*b* and a flange 5*a* latched by the contact segment 4 (FIG. 5A, FIG. 5B, and FIG. 5C) in the bottom portion of the main part 5*b*. A diameter of the main part 5*b* is one size larger than the diameter of the button 3 (FIGS. 4A,. 4B) and is equal to the circle accomplished by the outer periphery of six ribs 3*d*.

On an upper end surface of the main part 5*b*, which is fitted loosely into the guide recess portions 1*c*, projections 5*c* are set up so as to be spaced apart at 60 degree intervals. The upper ends of the projections are applied to be rotor cam sides 5*d* having an opposite inclination to the button cam sides 3*e*. Also, recesses 5*e* are formed on the side of a main part spaced at 120 degree intervals in the longitudinal direction. The latching portion 4*c* (FIG. 5B) of the contact segment 4 (FIG. 5) as described hereinbefore is mated with the recesses 5*e*, to thereby fix the contact segment 4 (FIG. 5A, FIG. 5B and FIG. 5C) to the flange 5*a*. Also, projecting portions 5*f* are provided on the upper surface of the flange 5*a*. The projecting portions 5*f* are pressingly fixed to the backside of the upper end surface 1*a*1 (FIG. 2A) while the button 3 (FIGS. 4A, 4B) is existing at the upper dead center, thereby serving as members to enable a moderate space to be maintained between the contact segment 4 (FIGS. 5A, 5B and 5C) and stationary terminals 2*a*, 2*b*, and 2*c*.

The rotor 5 is a member having a translating mechanism that converts linear motion of a button 3 (FIGS. 4A, 4B) to rotary motion. And also, it is a member for effecting an ON/OFF switching action by cooperation of a contact segment 4 (FIG. 5A, FIG. 5B and FIG. 5C). When the button 3 (FIGS. 4A, 4B) is present in the upper dead center, the rotor 5 is under the state of being pressingly fixed at the backside of the upper end surface 1*a*1 (FIG. 2A) by an opposing force of the first spring 7. At this time, the upper end surface of the flange 5*a* and the backside of the upper end surface 1*a*1 (FIG. 2A) are not closely brought into contact because the projecting portions 5*f*provided in the flange 5*a* are existing there, but face each other with a certain space vacated. The contact segment 4 latched by the flange 5*a* in the upper dead center is kept in the space vacated by the flange 5*a* and the backside of the upper end surface 1*a*1 (FIG. 2A) in the state of the arms 4*a* buckled. Along with this, successive ON/OFF electrical contact is effected between the stationary terminals 2*a*, 2*b*, and 2*c* provided at the backside of the upper surface 1*a*1 (FIG. 2A)

When the button 3 (FIGS. 4A, 4B) is pressed, button cam sides 3*e* descend along guide recess portions 1*c* while pressing rotor cam sides 5*d*, that is, a rotor 5. At this time, the space between the flange 5*a* and the upper end surface 1*a*1 (FIG. 2A) spreads gradually. However, arms 4*a* which suited the state of buckling retained the state of an electrical contact between stationary terminals 2*a*, 2*b*, and 2*c* by extending gradually, corresponding to the expansion of the interval therebetween. Accordingly switching position of ON/OFF is retained as it is.

Further, when the button 3 (FIGS. 4A, 4B) is pressed and rotor cam sides 5*d*descend downwardly of the lower end portions of the guide recess portions 1*c*, the rotor cam sides 5*d* separate from the guide of the guide recess portions 1*c* to circumferentially slide the slant cylinder portion cam sides 1*e* which separate the guide recess portions 1*c* with each other. Namely, predetermined angle rotation of the rotor 5 is caused to be carried out. At this time, a contact segment 4 (FIGS. 5A, 5B and 5C) which is fixed to the rotor 5 is also rotated along with the rotor 5. This renders the circumstance under which the electrical contact between the arms 4*a* and the stationary terminals 2*a*, 2*b*, and 2*c* to change, and the alternating ON/OFF switching action is effected.

In this manner, alternating ON/OFF switching action is effected in the state where arms 4*a* have gone slack. This permits the friction generated between the arms 4*a*and the stationary terminals 2*a*, 2*b*, and 2*c* at the time of rotation of the arms 4*a* to be smaller than the conventional pushbutton switch. Hence, it became unnecessary to enclose grease etc., between the arms 4*a* and the stationary terminals 2*a*, 2*b*, and 2*c*.

Figure 7A:
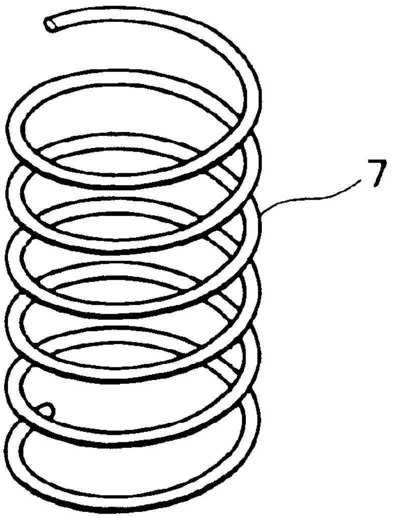
FIG. 7A is a perspective view of the first spring.
Figure 7B:
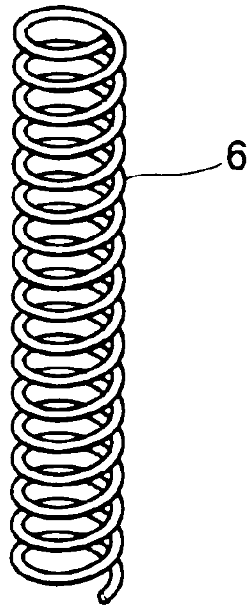
FIG. 7B is a perspective view of the second spring.

FIG. 7A is a perspective view of the first spring 7, and FIG. 7B is a perspective view of the second spring 6.

The first spring 7 is a member fittingly mounted between the lower case 8 and the rotor 5 (FIGS. 6A, 6B) to urge the rotor 5 (FIGS. 6A, 6B) upwardly all the time. Also, the second spring 6 is a member fittingly mounted between the lower case 8 and the button 3 (FIGS. 4A, 4B) to urge the button 3 (FIGS. 4A, 4B) upwardly all the time. The second spring 6 is a coil spring having a smaller diameter than the first spring 7. Also, the first spring 7 and the second spring 6 are provided in a coaxial manner.

With this arrangement, according to this invention, the button 3 (FIGS. 4A, 4B) and the rotor 5 (FIGS. 6A, 6B) are urged by the separate spring. In the process wherein the button 3 is pressed as far as the lower dead center and then returns to the upper dead center, a return sound of "a click of a latch" is emitted. This return sound is emitted by an opposing force of the first spring 7 when the rotor 5 (FIGS. 6A, 6B) collides with another member.

Generally, only one spring is used in a conventional pushbutton switch. A returning action of the member corresponding to a button and a rotor has been covered by this one spring. Therefore, it was needed that, as a spring, a strong spring with a bigger spring constant than the first spring 7 of this invention was used. Hence, a bigger return sound was emitted by a mutual collision of the members with a strong force when the button returns by an opposing force of the spring.

However, according to this invention, the spring which urges the button 3 (FIGS. 4A, 4B) and the spring which urges the rotor 5 (FIGS. 6A, 6B) are arranged separately.

Hence, it becomes possible to use the spring with a smaller spring constant to enable the return sound emitted by the mutual collision of the rotor (FIGS. 6A, 6B) and other members when the button 3 (FIGS. 4A, 4B) returns, to be smaller than a conventional spring.

Figure 8:
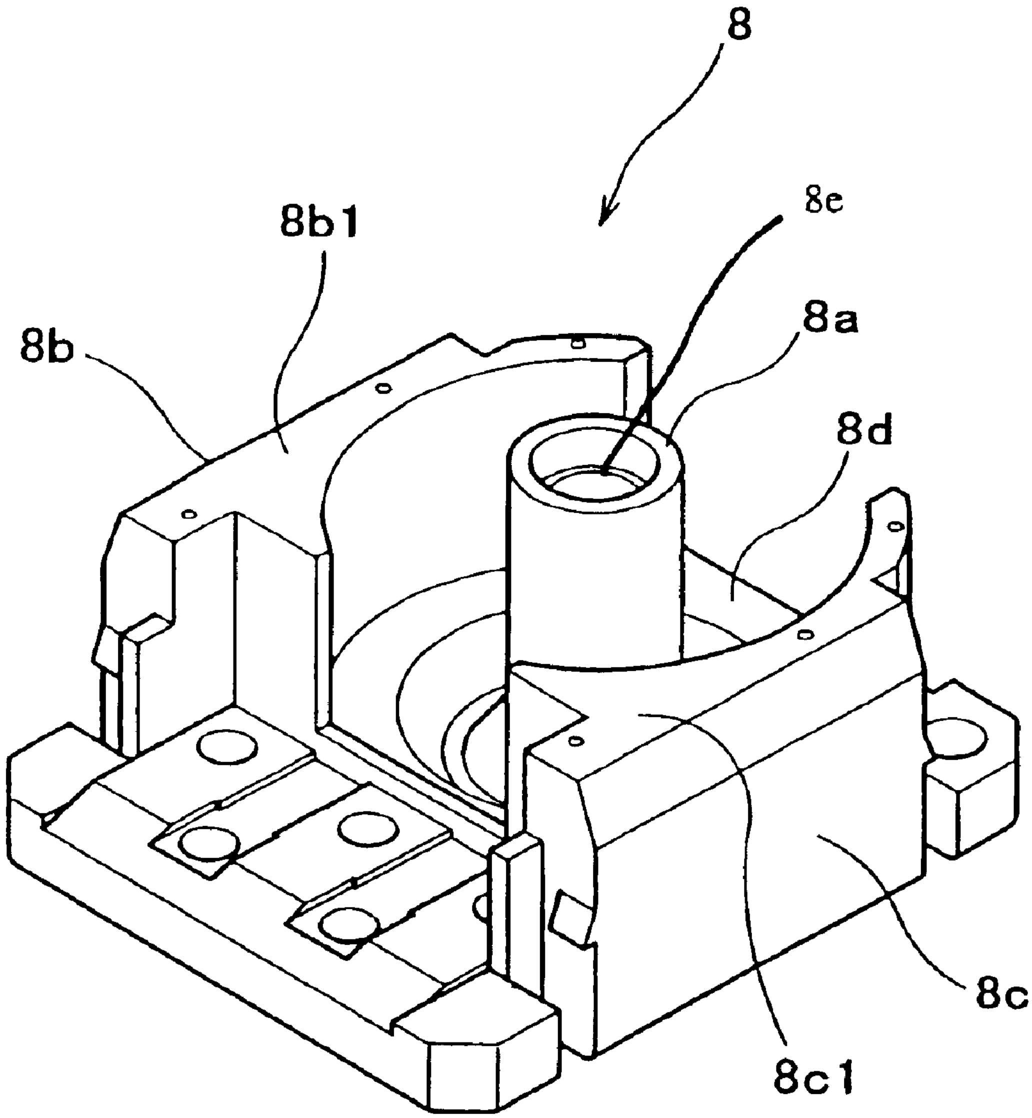
FIG. 8 is a perspective view of the lower case.

FIG. 8 is a perspective view of the lower case 8.

The lower case 8, engaged with the upper case 1 constitutes a bottom part of a pushbutton switch. The lower case 8 includes a cylindrical insertion portion 8*a* disposed so as to correspond to the guide pole 3*a* of the button 3 (FIGS. 4A, 4B). The insertion portion 8*a* has an opening portion 8*e* with a little expanded diameter. In this expanded diameter portion, the second spring for urging the above described button 3 (FIGS. 4A, 4B) is inserted. Also, the rotor 5 (FIGS. 6A, 6B) as described hereinbefore is fitted loosely into this cylindrical insertion portion 8*a* outside. The first spring which urges the rotor 5 (FIGS. 6A, 6B) is provided to be coaxial with the second spring in a manner so as to surround the second spring 6 to be supported at the bottom portion 8*d* of the lower case 8.

Also, the lower case 8, set up from the bottom, includes side walls 5*b* and 8*c*forming the side surfaces of a pushbutton switch. The upper end surfaces 8*b*l and 8*c*1 of these side walls 8*b* and 8*c* are closely brought into contact with a backside of the upper end surface 1*a*1 (FIG. 2A) when engaged with the upper case 1 to interpose a flat portion 2*a*l, 2*b*1, and 2*c*1 of stationary terminals 2*a*, 2*b* and 2*c* therebetween, to thereby serve to fix the stationary terminals 2*a*, 2*b*, and 2*c*.

Subsequently, the operation of the cam mechanism of a pushbutton switch and alternating ON/OFF switching action will be explained in conjunction with FIG. 9 to FIG. 12.

FIG. 9A, FIG. 10A, FIG. 11A, and FIG. 12A are schematic diagrams of a cam mechanism constituted by the cylinder portion 1*b*, the button 3 (FIGS. 4A, 4B), and the rotor 5 (FIGS. 6A, 6B) deployed in a plan view. FIG. 9B, FIG. 10B, FIG. 11B, and FIG. 12B are schematic diagrams of the disposing relationship between the contact segment 4 (FIG. 5A) corresponding to FIG. 9A, FIG. 10A, FIG. 11A, and FIG. 12A, respectively, and a first terminal 2*a*.

Figure 9A:
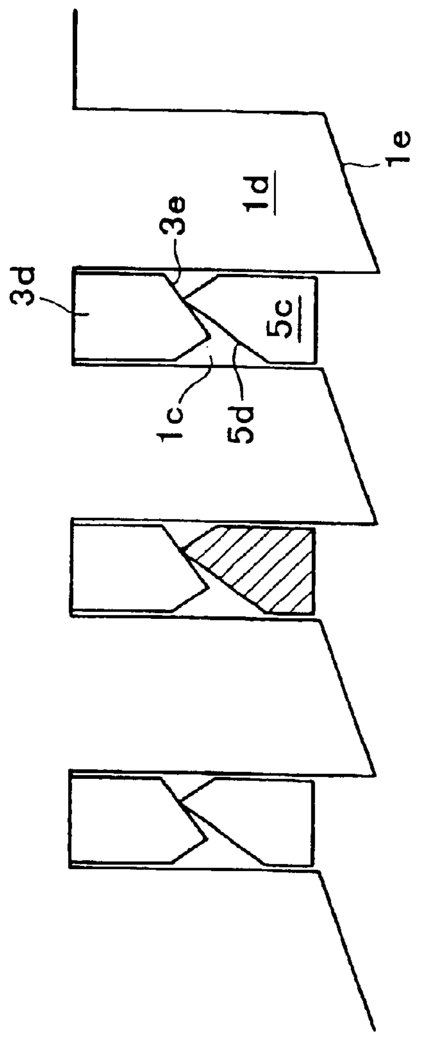
FIG. 9A is a schematic diagram deploying a cam mechanism in a plan view when a button is existing in the upper dead center.

FIG. 9A is a diagram of a state of cam mechanism when the button 3 (FIGS. 4A, 4B) is not pressed but existing in the upper dead center. In this state, ribs 3*d* of the button 3 (FIGS. 4A, 4B) and projections 5*c* of the rotor 5 (FIGS. 6A, 6B) are urged upwardly by the second spring 6 (not shown) and the first spring 7 (not shown) to be disposed at the upper end of the guide recess portions 1*c* of the cylinder portion 1*b*. At this time, button cam sides 3*e* of the ribs 3*d* are in the state where electrical contact with the projections 5*c* of the rotor 5 (FIGS. 6A, 6B) is effected.

Figure 9B:
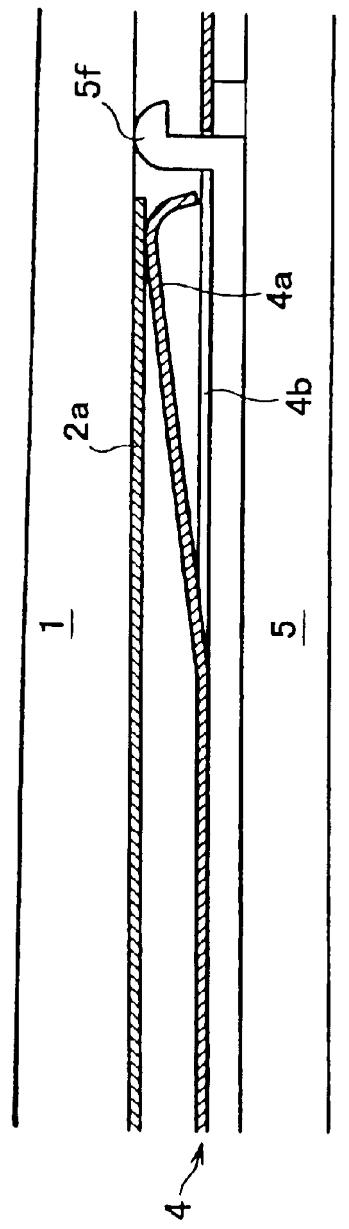
FIG. 9B is a schematic diagram showing a disposing relationship between a contact segment and the first terminal.

FIG. 9B is a schematic diagram of a disposing relationship between a contact segment 4 (FIG. 5A) when a button 3 (FIG. 4A, 4B) is in the state shown in FIG. 9A and the first terminal 2*a*. In the state shown in FIG. 9A, the rotor 5 (FIGS. 6A, 6B) is urged by the first spring 7 (not shown) to be approaching the backside of the upper end surface 1*a*1 (FIG. 2A) most. Contact of projecting portions: 5*f* provided in the flange 5*a* of the rotor 5 (FIGS. 6A, 6B) with the backside of the upper end surface 1*a*1 (FIG. 2A) allows a moderate space to be vacated between the rotor 5 (FIGS. 6A, 6B) and the upper case 1. In this state, the arms 4*a* of the contact segment 4 (FIG. 5A) provided in the flange 5*a*contact with the first terminal 2*a* while buckling to define the ON position of a pushbutton switch.

Figure 10A:
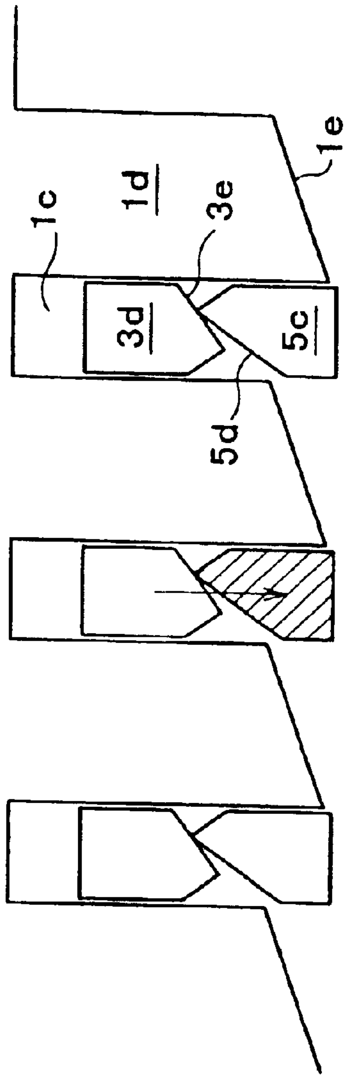
FIG. 10A shows another view of the cam mechanism in plan view and FIG. 10B shows a disposing relationship between a contact segment and the first terminal.

FIG. 10A is a diagram of a state of a cam mechanism in the outset of a button-pressing action of a button 3 (FIG. 4A, 4B). In this state, ribs 3*d* descend gradually along the guide recess portions 1*c* while pressing the projections 5*c* of the rotor 5 (FIGS. 6A, 6B) by button cam sides 3*e*. A force to go rightward (rotate) in the diagram arises in the projections 5*c* by the action of the button cam sides 3*e* and the rotor cam sides 5*d*. However, in this stage, rotation is prevented by side walls of projections 1*d*.

Figure 10B:
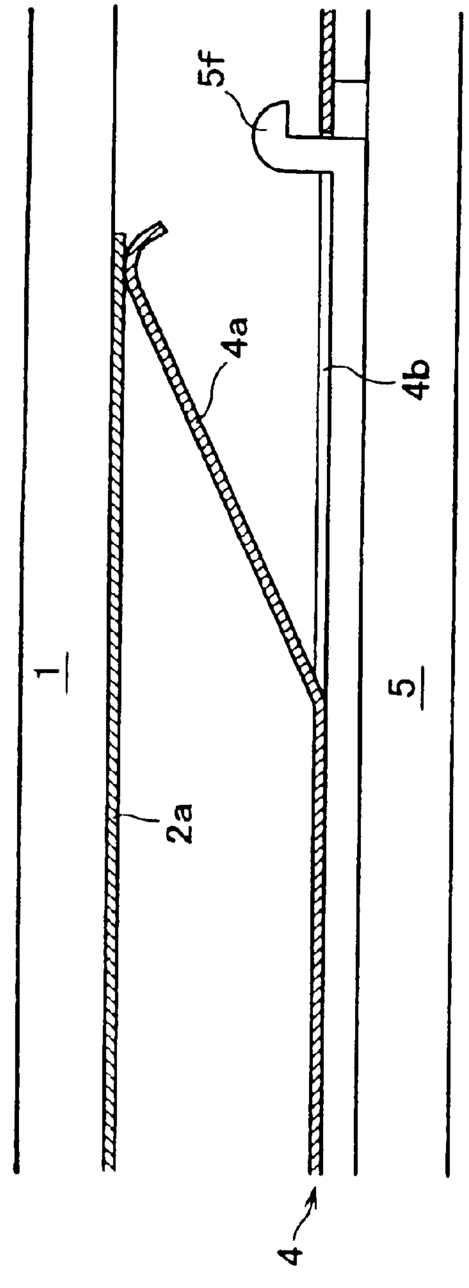

FIG. 10B is a schematic diagram of a disposing relationship between the contact segment 4 (FIG. 5A) when a button 3 (FIGS. 4A, 4B) is in the state shown in FIG. 10A and the first terminal 2*a*. Since a rotor 5 (FIGS. 6A, 6B) descends by being pressed by ribs 3*d*, space between the rotor 5 (FIGS. 6A, 6B ) and the upper case 1 spreads compared to the space shown in FIG. 9B. However, arms 4*a* of the contact segment 4 (FIG. 5A) deform following the expanded space to keep the contact state between the arms 4*a* and the first terminal 2*a*. Then, the ON position of the pushbutton switch is retained.

Figures 11A, 11B:
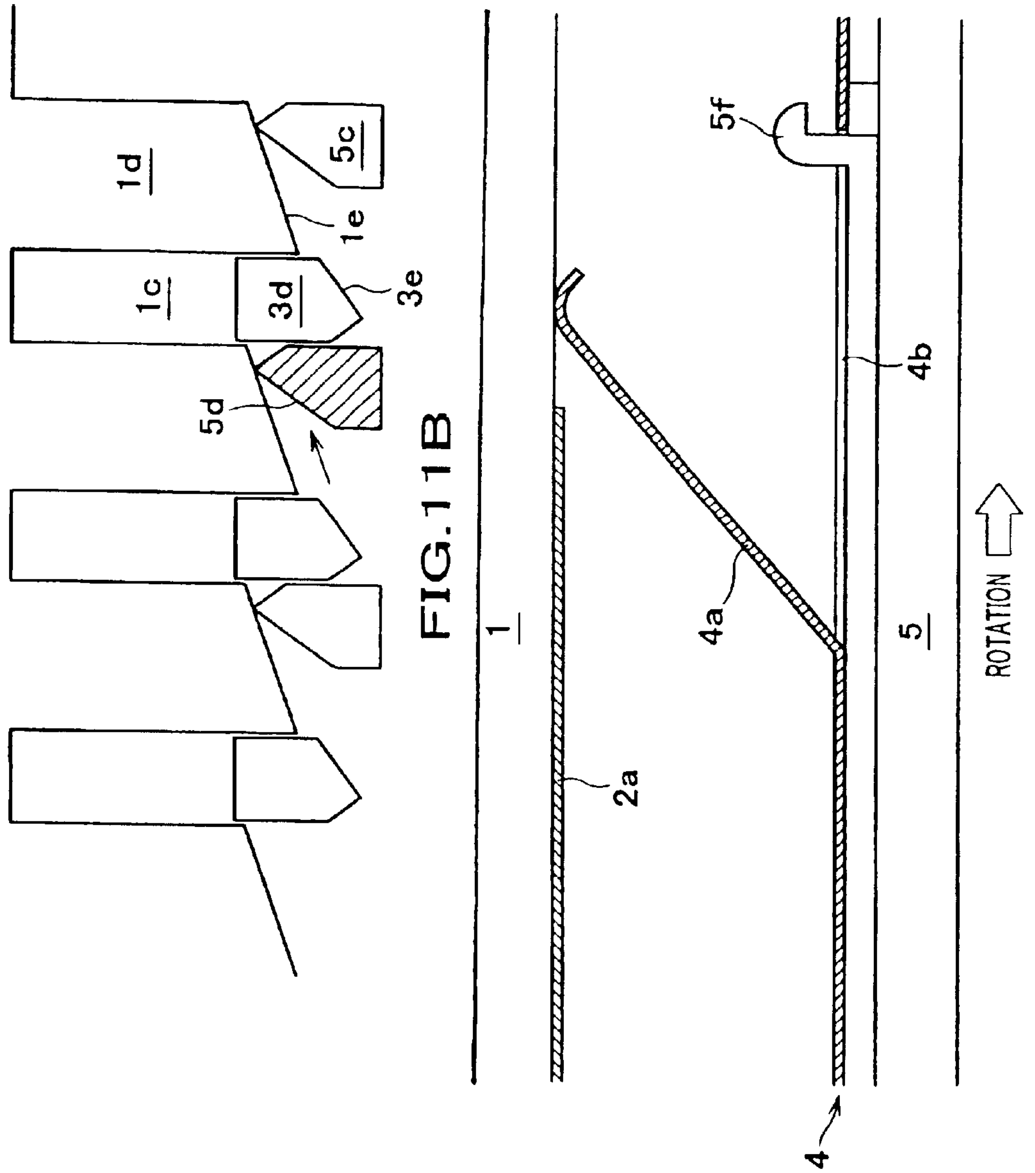
FIG. 11A is a schematic diagram deploying a cam mechanism in a plan view when a button is existing in the lower dead center.
FIG. 11B is a schematic diagram showing a disposing relationship between a contact segment and the first terminal.

FIG. 11A is a diagram of a state of cam mechanism when a button 3 (FIGS. 4A, 4B) is pressed as far as the lower dead center. In this state, ribs 3*d* descend as far as the lower end portions of the guide recess portions 1*c*. Then, the projections 5*c* of a rotor 5 (FIG. 6A) are separated from the guide of the guide recess portions 1*c*. By the way, since upward force is always applied to the rotor 5 (FIG. 6A) by the first spring 7, the projections 5*c* carry out a obliquely upward sliding (rotating) on the button cam sides as shown by the arrow in the diagram to collide with adjoining ribs 3*d* and stop. When the projections 5*c* and the ribs 3*d* collide, the press sound of "a click of a latch" occurs.

FIG. 1B is a schematic diagram of the disposing relationship between a contact segment 4 (FIG. 5A) when a button 3 (FIG. 4A) is in the state shown in FIG. 11A and the first terminal 2*a*. Since the projections 5*c* are moving below further than the case in FIG. 10A, space between a rotor 5 (FIG. 6A) and the upper case 1 spreads further than the case in FIG. 10B. Also, as shown in FIG. 11A, rotation of the rotor 5 (FIG. 6A) causes arms 4*a* to move (rotate) rightward in the drawing: Then, contact of the first terminal 2*a*and the arms 4*a* is broken so that position of the switch is changed to the OFF state.

In this manner, a pushbutton switch of this invention effects the ON/OFF switching action simultaneously with a press sound. In the conventional pushbutton switch, since the press sound and the timing of the ON/OFF operation of a switch had shifted, the user using a pushbutton switch might have a sense of incongruity. However, with the pushbutton switch of this invention, since the press sound and the ON/OFF operation of a switch synchronize, the feeling of operation of the user who uses a pushbutton switch improves.

Also, by changing the degree of the deflection of arms 4*a*, the timing of the alternating ON/OFF switching action can be changed in a pressing process of the button 3 (FIG. 4A). For example, with an employment of arms 4*a* which are almost not curved but assume a flat form, it becomes possible to effect an alternating ON/OFF switching action without waiting for the press sound emitted at the outset of a button-pressing action of the button 3 (FIG. 4A). Further, variation in the form of the stationary terminals 2*a*, 2*b*, and 2*c* enables the switch to define the ON/OFF position at any time at will when a button 3 (FIG. 4A) returns from the lower dead center to the upper dead center. In this manner, by an easy specification change, a pushbutton switch of this invention permits the timing of the alternating ON/OFF switching action to be changed at any time at will in the reciprocating motion of the button 3 (FIG. 4A). Hence, a pushbutton switch having an ON/OFF switching action suitable for the purpose of use can be achieved.

Figure 12A:
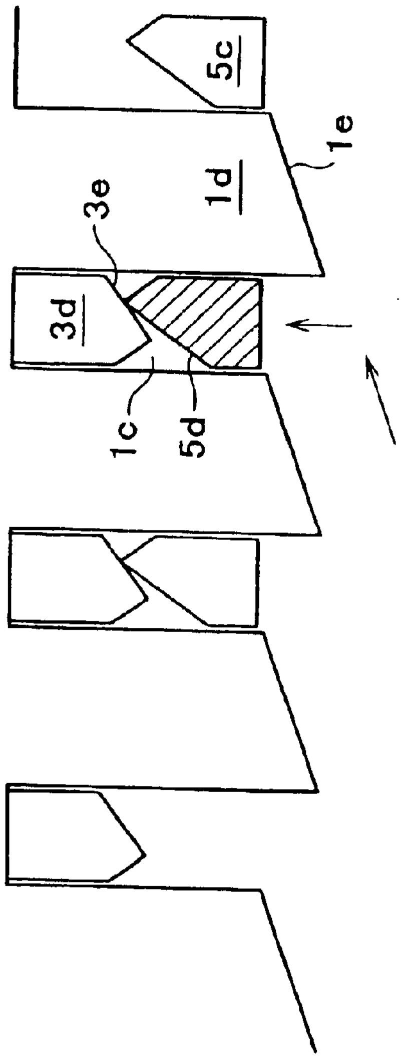
FIG. 12A is another view of the cam mechanism and FIG. 12B shows the relationship between the contact segment and first terminal.

FIG. 12A is a diagram of the state of the cam mechanism in which a button 3 (FIG. 4A) rises by an opposing force of the first spring 7 and the second spring 6 to return to the upper dead center. In this state, projections 5*c* slide (rotate) on cylinder portion cam sides 1*e* by receiving the upward urge from the first spring 7 to be engaged with guide recess portions 1*c* adjacent to the-guide recess portions 1*c* disposed first. When the projections 5*c* are engaged with the guide recess portions 1*c*, the projections 5*c* collide with a button cam side 3*e* of ribs 3*d* to cause a return sound of "a click of a latch" to be emitted.

According to a pushbutton of this invention, the rotor 5 (FIG. 6A) is urged by the first spring 7 with a spring constant smaller than the conventional one to collide with button cam sides 3*e*. This enable the return sound to be smaller compared to a conventional pushbutton switch.

Figure 12B:
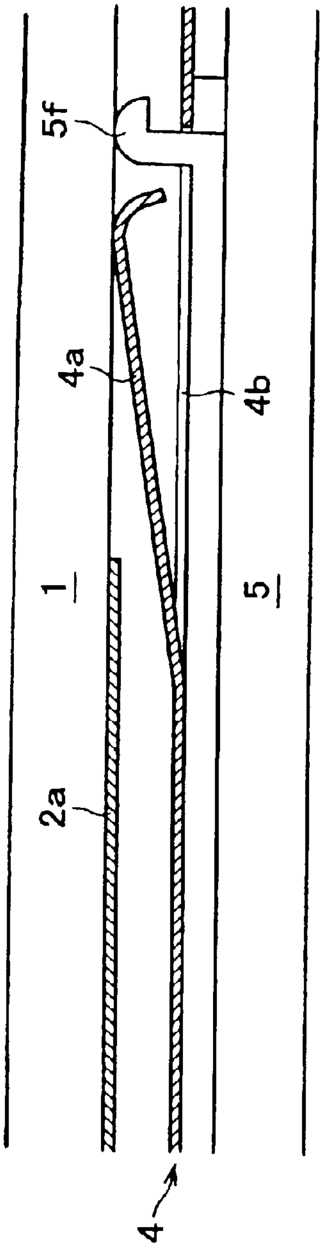
Figure 13:
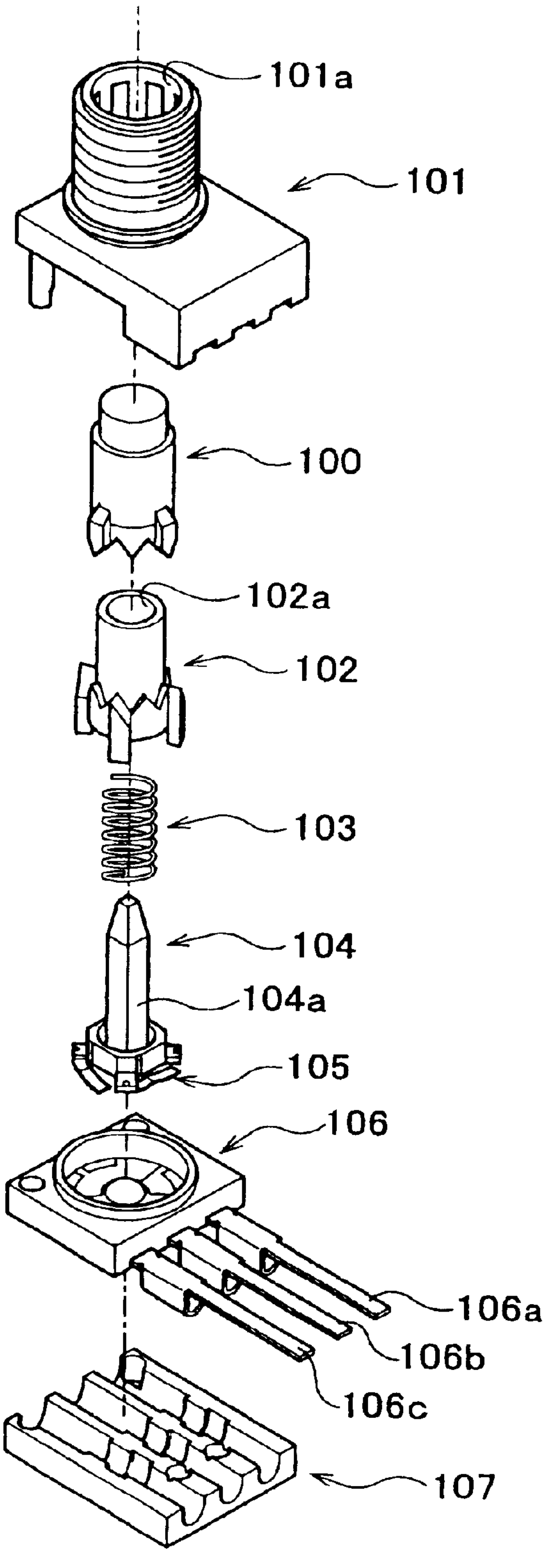
FIG. 13 PRIOR ART
FIG. 13 is an exploded perspective view of a conventional pushbutton switch.
Figure 14:
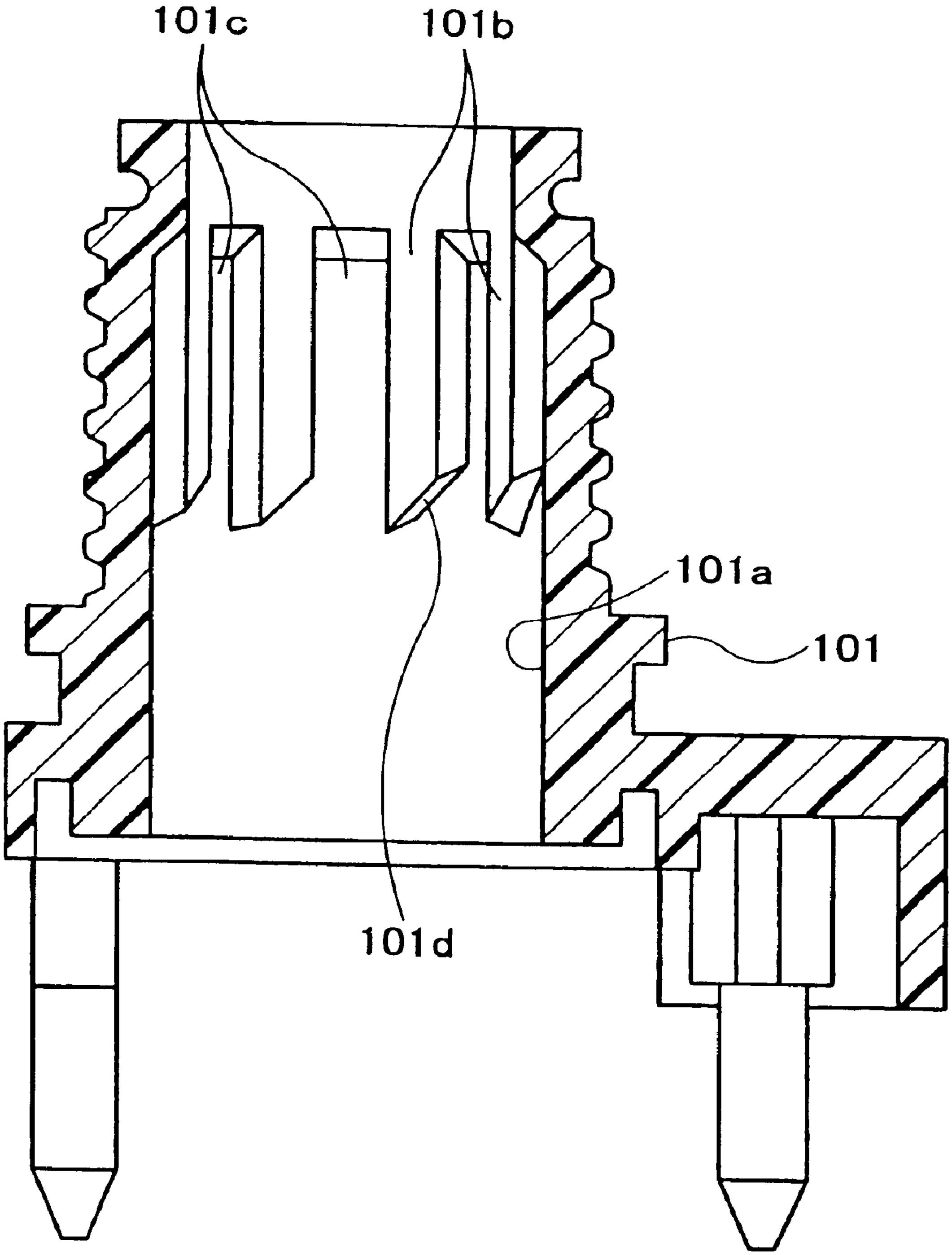
FIG. 14 PRIOR ART
FIG. 14 is a sectional view of an actuator housing 101 in the conventional pushbutton switch.
Figure 15B:
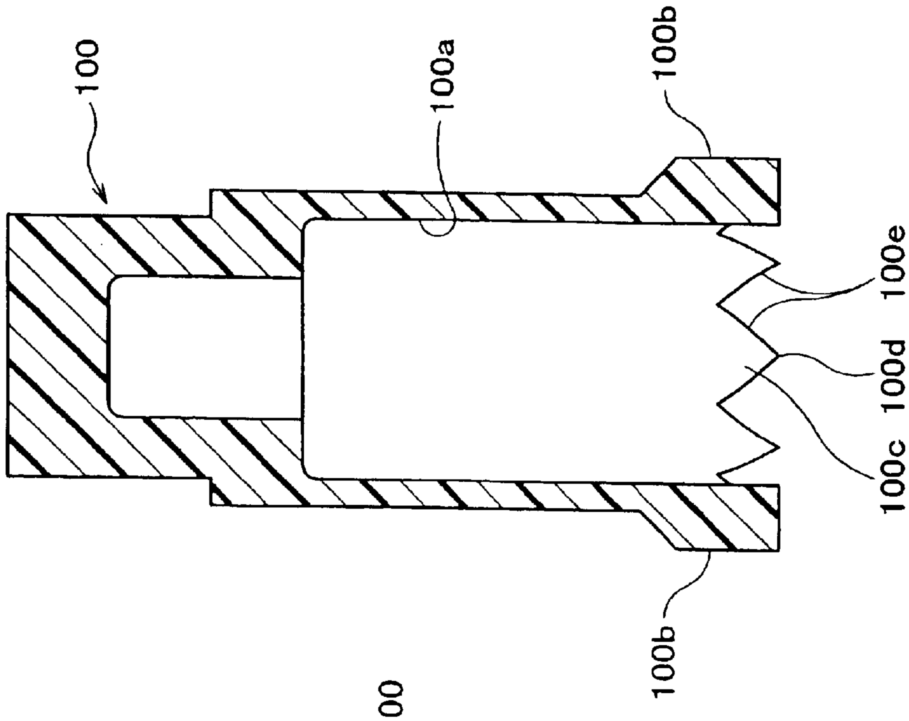
PRIOR ART FIG.15B
FIG. 15A is a sectional diagram of a pushbutton in a conventional pushbutton switch, and FIG. 15B a side view thereof.
Figure 15A:
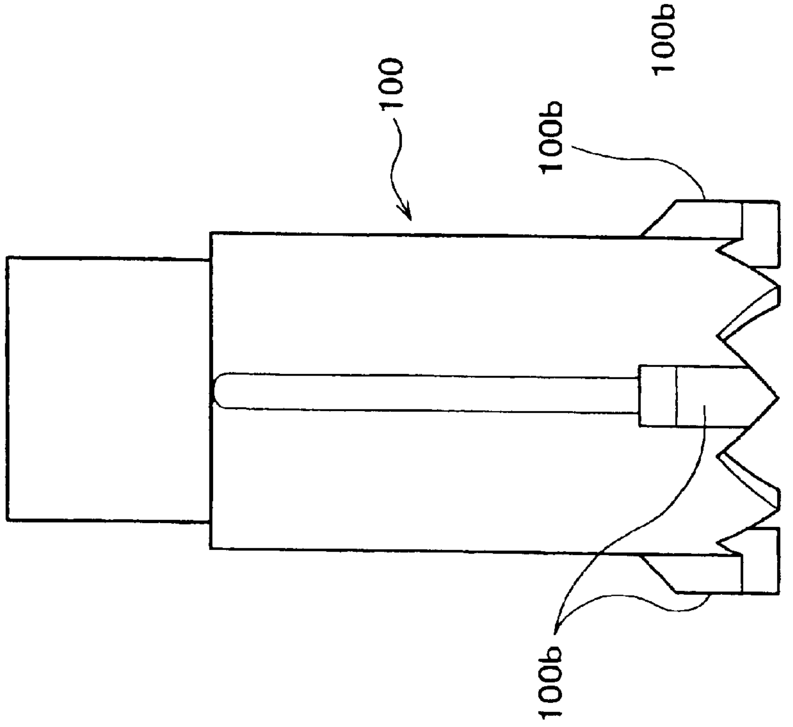
PRIOR ART FIG.15A
Figure 16B:
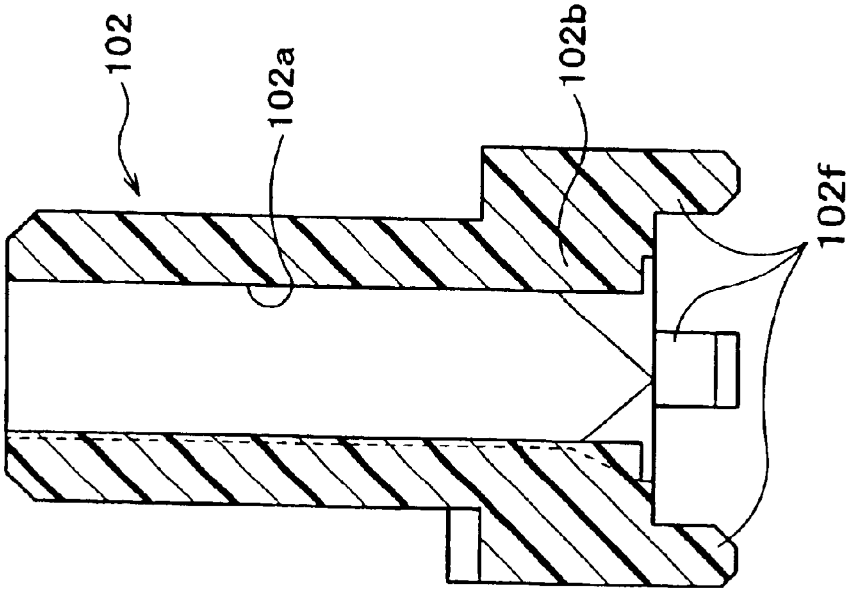
PRIOR ART FIG.16B
FIG. 16A is a side view of an actuator cam follower 102 in a conventional pushbutton switch and FIG. 16B is a side view thereof.
Figure 16A:
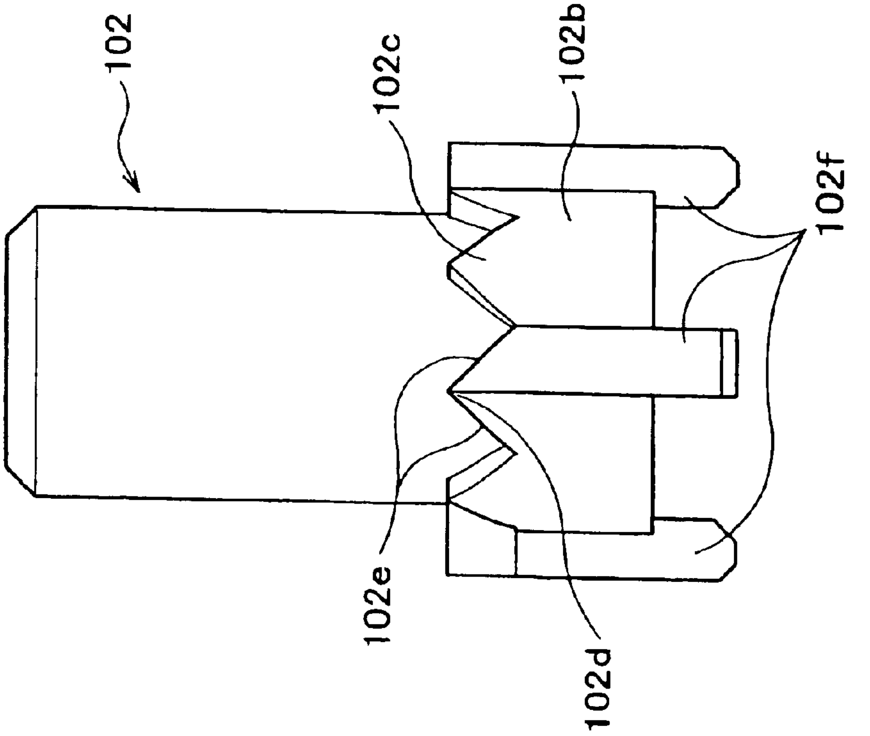
PRIOR ART FIG.16A
Figure 17:
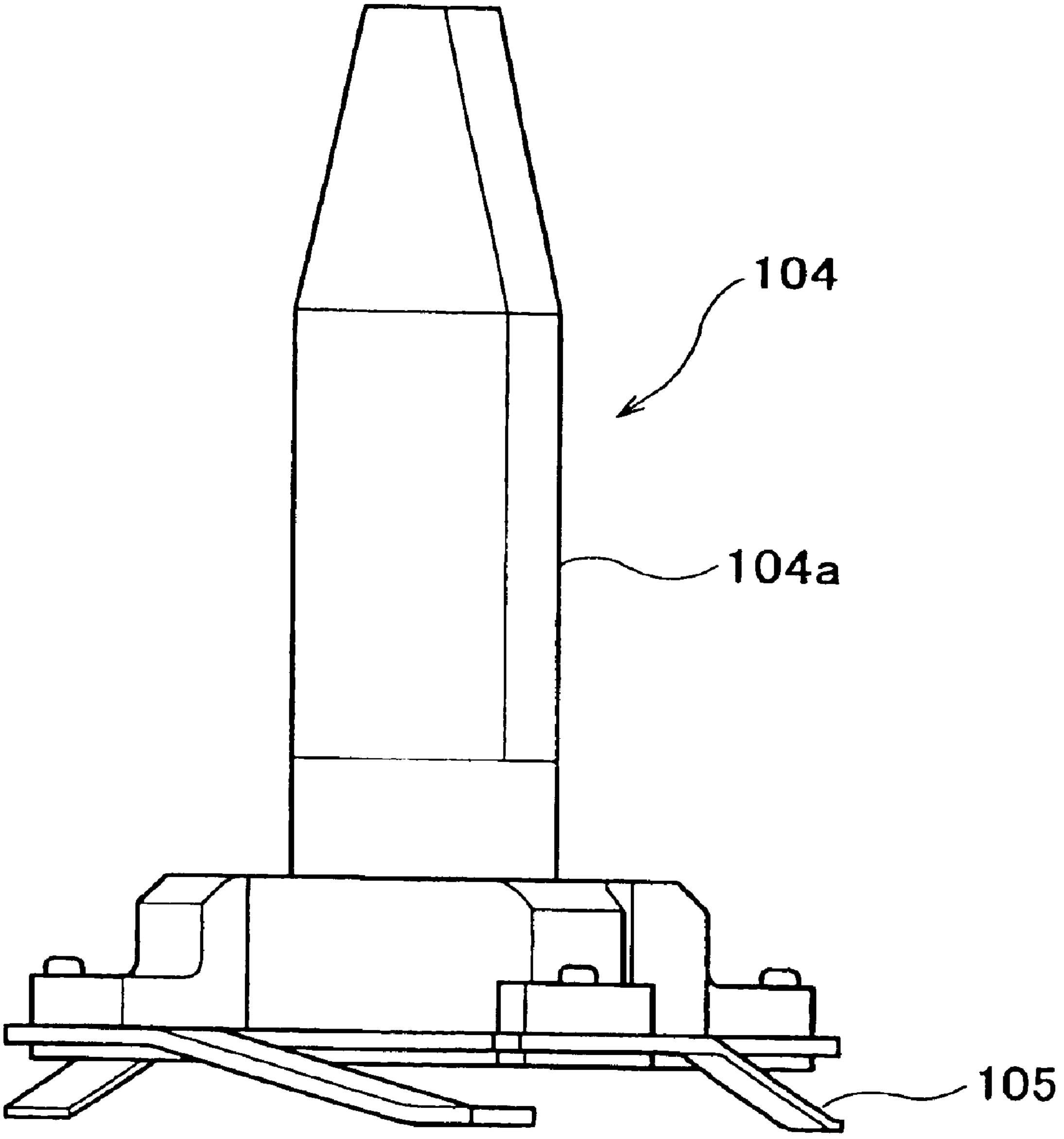
PRIOR ART FIG.17
FIG. 17 is a side view of a rotary contact carrier 104 in a conventional pushbutton switch.
Figure 18A:
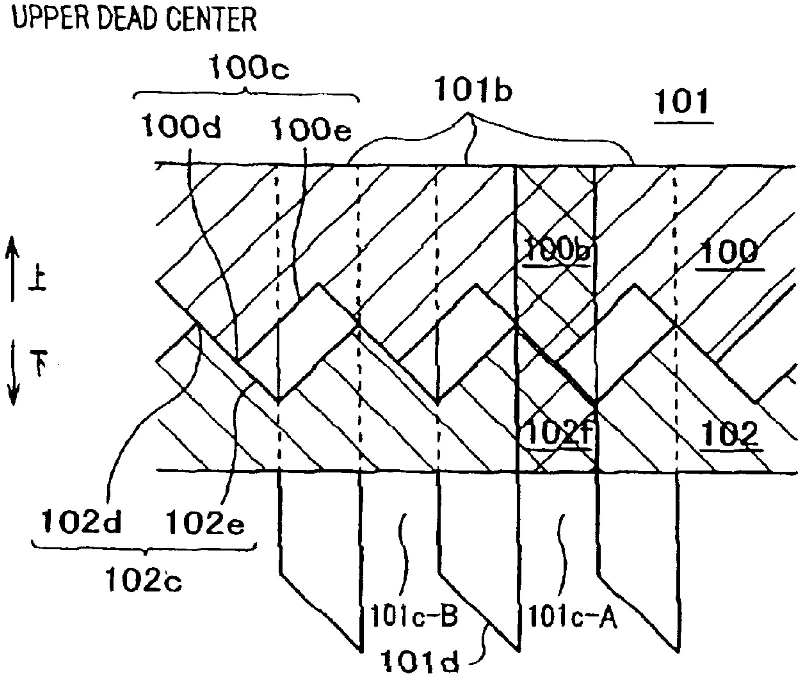
FIG.18A PRIOR ART
FIGS. 18A and 18B are schematic diagrams deploying a cam mechanism in a conventional pushbutton switch in a plan view.
Figure 18B:
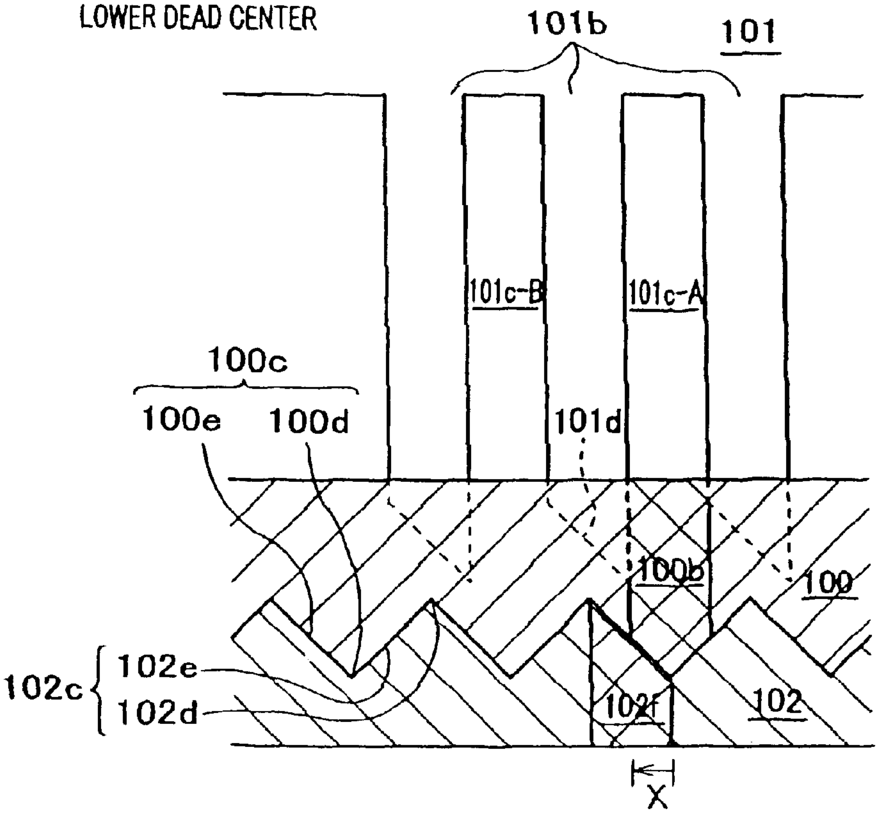
FIG.18B PRIOR ART
Figure 19:
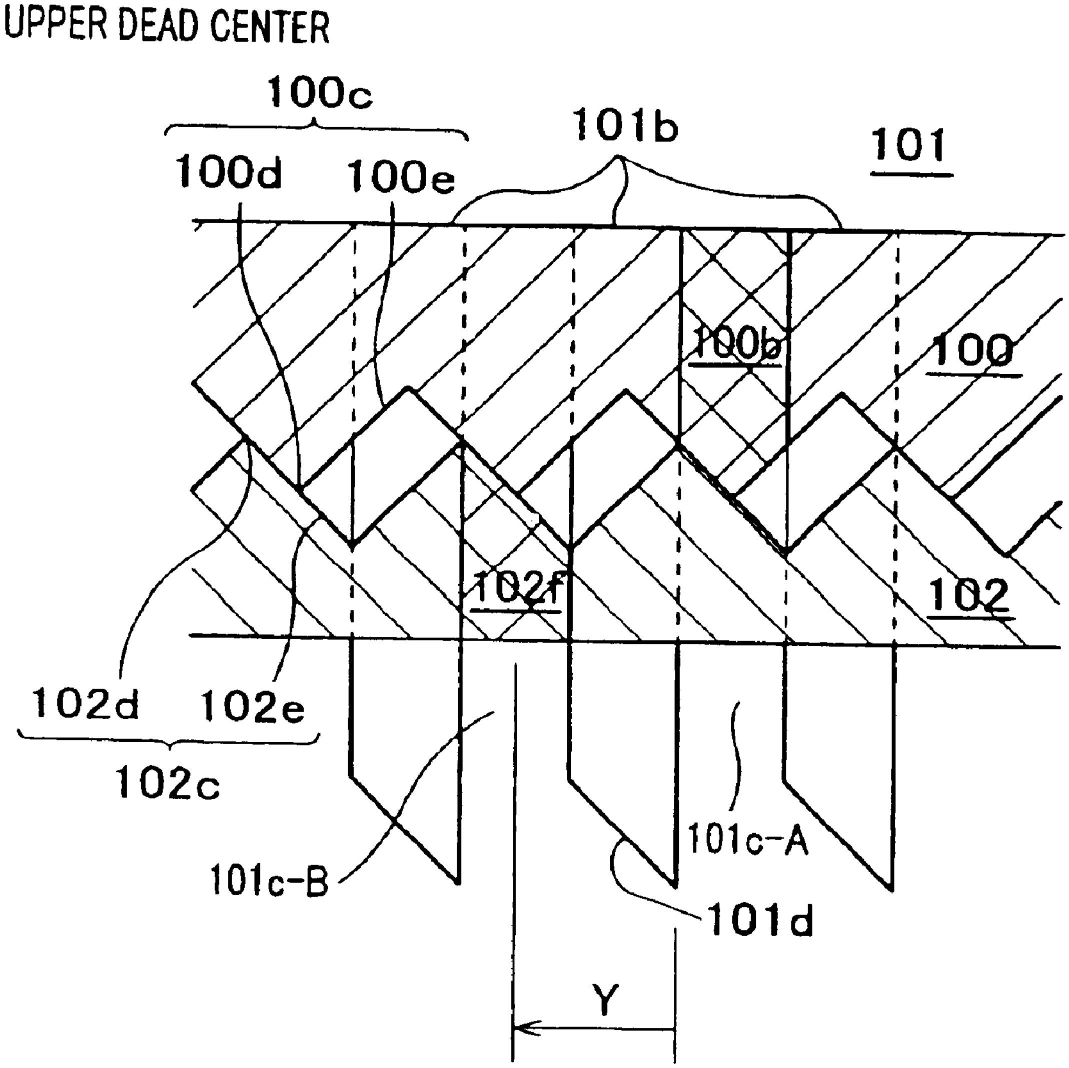
PRIOR ART FIG. 19
FIG. 19 is a schematic diagram deploying a cam mechanism in a conventional pushbutton switch in a plan view.
Figure 20:
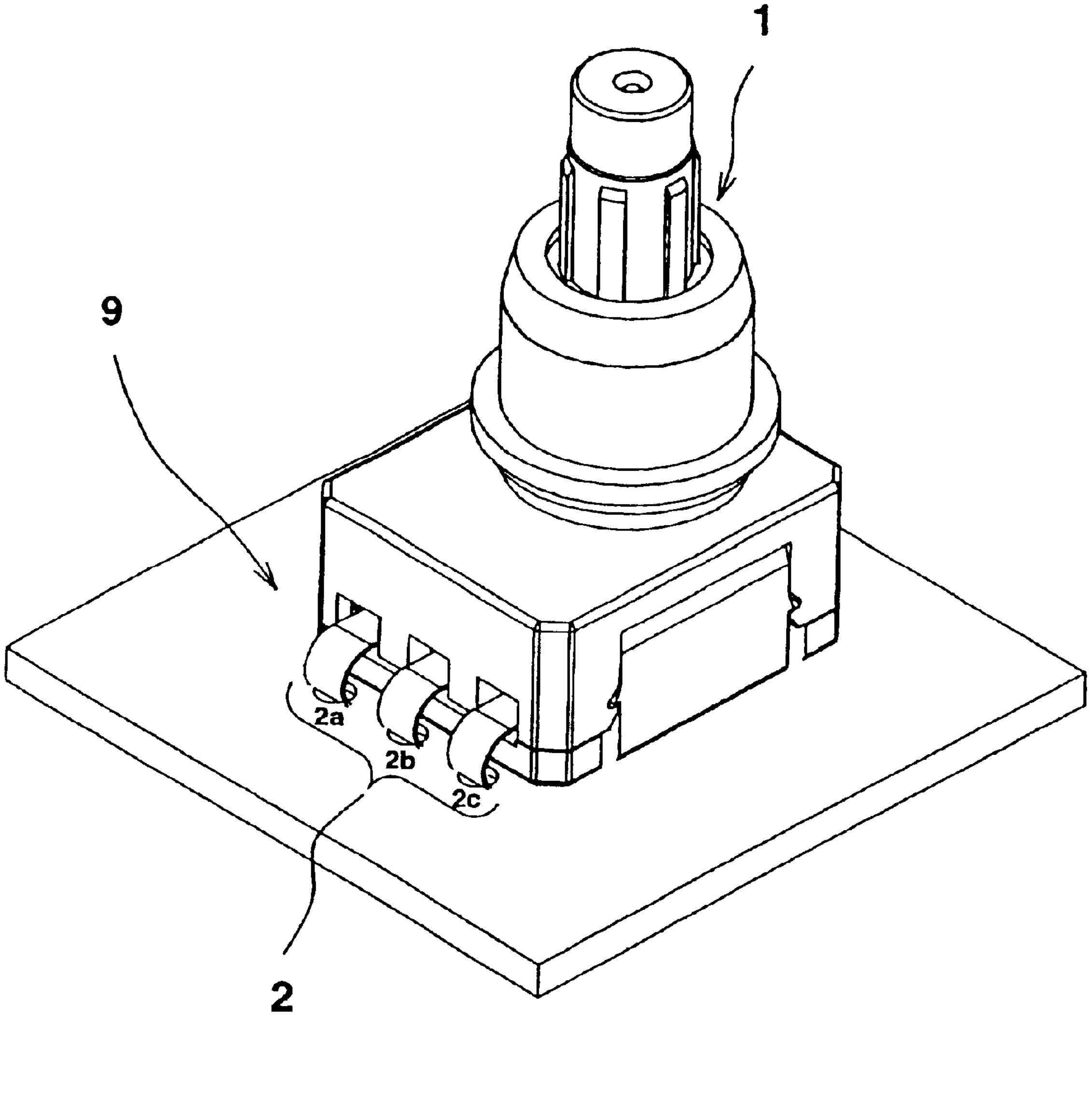
FIG. 20 is a perspective view of the stationary terminals directly connected to a printed circuit board.

FIG. 12B is a schematic diagram of the disposing relationship between a contact segment 4 (FIG. 5A) when the button 3 (FIG. 4A) is in the state shown in FIG. 12A and the first terminal 2*a*.

In the state shown in FIG. 12A, the button 3 (FIG. 4A) has returned to the upper dead center. Then, a state in which the rotor 5 (FIG. 6A) most completely approaches the back surface of the upper end surface 1*a*1 (FIG. 2A) is made. Similarly to the case shown in FIG. 9B, the projecting portions 5*f* contact with the back surface of the upper end surface 1*a*1 (FIG. 2A) to maintain a suitable space between the rotor 5 (FIG. 6A) and the upper case 1. In-this state, arms 4*a* of the contact segment 4 (FIG. 5A) do not contact with the first terminal 2*a*. Then, the OFF position of a pushbutton switch is defined.

This invention thus arranged is remarkably effective in the below-mentioned manner.

A pushbutton of this invention is characterized in that even if space between a rotor (contact segment) and stationary terminals spreads by a button-pressing action, a contact between the stationary terminals and the contact segment is retained by buckling capacity of arms provided in the contact segment. Hence, by changing the degree of the deflection (curving rate), the timing to make and break electrical contacts can be set at any time at will in the button-pressing action. Namely, the timing of the alternating ON/OFF switching action can be set at any time at will in the button-pressing action. Also, variation in the form of the stationary terminals permits the timing of the alternating ON/OFF switching action to be set at any time at will in the return action of the button to the upper dead center.

In addition, in a pushbutton switch of this invention, alternating the ON/OFF switching action is effected under the state of arms which have gone slack. Hence, the friction generated between the arms and the stationary terminals at the time of the rotation of the arms can be smaller than the conventional pushbutton switch. Accordingly, it is unnecessary to enclose grease etc., between the arms and the stationary terminals.

In a pushbutton switch of this invention, separated springs (the second spring and the first spring) perform to urge a button and a rotor, while conventionally this function was achieved by one spring. Thus, as the first spring to urge the rotor, the spring with a smaller spring constant and little opposing force can be used compared with a conventional spring, thereby allowing a return sound emitted due to the collision of the rotor urged by the first spring and other members to be smaller than a conventional pushbutton switch.

Also, in a pushbutton switch of this invention, arms of a contact segment provided in a rotor buckle serve as a cushion, to thereby allow the impact force caused by the collision of the rotor and other members to be smaller so as to make the return sound smaller than conventional pushbutton switch.

A pushbutton switch of this invention is provided with projections for prevention of an excess rotary movement on the outer periphery of a button. These projections for prevention of an excess rotary movement guide the button only in the vertical direction. Hence, rotation of the button in the circumferential direction is obviated even when the button is pressed excessively and ribs of the button are separated from the guide recess portions. Thus, the disadvantage that the ribs ride over the cylinder portion cam sides can be prevented.

A pushbutton switch of this invention is arranged in a manner that a guide pole is extending from the lower end portion of a button and this guide pole is guided by an insertion portion of the lower case when a button-pressing action is performed. Thus, a slight movement of the button in the horizontal direction is suppressed when the button has been pressed.

A pushbutton switch of this invention is arranged in a manner that terminal portions of the stationary terminals that connect an external wiring extend downwardly forming into the letter "U" from flat surface portions of the stationary terminals. Further, the terminal portions are formed into a curving shape in spaced apart relation from the flat surface portions, to thereby fix the external wiring reliably irrespective of the form of the external wiring inserted therein.

In a pushbutton switch of this invention, by connecting stationary terminals directly to a printed circuit board 9, it is possible to provide alternative electrical connections to a variety of popular applications.

What is claimed is:

1. A pushbutton switch, comprising:

a case including a substantially cylindrical-shaped cylinder portion;

a substantially cylindrical button which is fitted into said cylinder portion slidably;

a substantially cylindrical rotor, having a flange at the bottom thereof, which performs a sliding reciprocating motion along a long axis of the cylinder portion in response to a reciprocating motion of said button, while carrying out predetermined angle rotation in a predetermined direction about the long axis of the cylinder portion;

a substantially toroidal plate contact segment which is inserted in said rotor and latched by said flange of said rotor;

plurality of stationary terminals provided in said case so as to be facing said contact segment; and wherein said rotor performs a predetermined angle rotation for every reciprocating motion of said button to effect a successive ON position where said contact segment makes electrical contact between said stationary terminals and OFF position where said contact segment breaks electrical contact alternately; wherein, tabular arms, which are curving toward the stationary terminals and contact with said stationary terminals, are provided at locations each on an outer periphery of said contact segment spaced at predetermined intervals, and wherein said arms retain a contact between said stationary terminals and said contact segment by elastically buckling according to a variation in distance between said stationary terminals and the rotor generated when said rotor performs said sliding reciprocating motion.

2. A pushbutton switch defined in claim 1, further comprising a first spring which urges said rotary contact element upwardly and a second spring which urges said button upwardly.

3. A pushbutton switch defined in claim 1, wherein projections are formed on the inner surface of said cylinder portion along the longitudinal direction separated mutually with guide recess portions spaced at predetermined intervals;

lower end portions of respective projections constitute slant cylinder portion cam sides;

ribs which are fitted loosely into said guide recess portions are formed on the outer periphery of the lower end portions of said button;

lower end portions of the ribs constitute slant button cam sides having substantially the same inclination with said cylinder portion cam sides;

projections which are fitted loosely into said guide recess portions are formed on the upper end portions of said rotor;

the upper end portions of the projections include slant rotor cam sides having inclination substantially contrary to said button cam sides;

said rotor cam sides perform a sliding movement along said cylinder portion cam sides by being pressed by said button cam sides along said guide recess portions; and said rotor cam sides perform a sliding movement along said button cam sides when said reciprocating motion and said predetermined angle rotation are performed so that said rotor cam sides engage with another guide recess adjacent to said guide recess.

4. A pushbutton switch defined in claim 1, wherein said button includes projections on an outer periphery thereof, which engage with guide recess portions formed on an inner periphery of said cylinder portion, for preventing rotation of said button.

5. A pushbutton switch defined in claim 1, further comprising:

a guide pole extending along the central axis of the button, and a cylindrical insertion portion in which an end portion of said guide pole is inserted.

6. A pushbutton switch defined in claim 1, wherein said stationary terminals are provided in said case including, flat surface portions which contact with said contact segment and terminal portions for connecting the external wiring to said pushbutton switch, wherein said terminal portions are extending downwardly forming into a letter of "U" from said flat surface portions and also formed into a curving shape in spaced apart relation from said flat surface portions.

7. A pushbutton switch defined in claim 1, wherein said stationary terminals are electrically connected directly to a printed circuit board.

* * * * *